United States Patent
Minami et al.

(10) Patent No.: US 7,214,755 B2
(45) Date of Patent: May 8, 2007

(54) CRYSTALLINE POLYMER OF HIGHER α-OLEFIN AND PROCESS FOR PRODUCING THE SAME

(75) Inventors: Yutaka Minami, Chiba (JP); Masami Kanamaru, Chiba (JP); Masanori Sera, Chiba (JP); Tatsuya Egawa, Chiba (JP); Takenori Fujimura, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 10/505,046

(22) PCT Filed: Feb. 19, 2003

(86) PCT No.: PCT/JP03/01794

§ 371 (c)(1),
(2), (4) Date: Feb. 3, 2005

(87) PCT Pub. No.: WO03/070790

PCT Pub. Date: Aug. 28, 2003

(65) Prior Publication Data

US 2005/0119374 A1    Jun. 2, 2005

(30) Foreign Application Priority Data

Feb. 21, 2002 (JP) ............................. 2002-044598

(51) Int. Cl.
*C08F 110/14* (2006.01)
*C08F 210/14* (2006.01)
*C08F 4/6192* (2006.01)

(52) U.S. Cl. ............... 526/348.3; 526/348; 526/348.6; 526/160; 526/161; 526/172; 526/134

(58) Field of Classification Search ............ 526/348.3, 526/348, 348.6, 160, 161, 172, 134
See application file for complete search history.

(56) References Cited

U.S. PATENT DOCUMENTS

| 4,990,424 A | * | 2/1991 | Van Dusen et al. ...... 430/108.8 |
| 5,187,250 A | * | 2/1993 | Asanuma et al. ......... 526/348.6 |
| 5,916,989 A | * | 6/1999 | Brookhart et al. ....... 526/348.6 |

FOREIGN PATENT DOCUMENTS

| JP | 1-95813 | 4/1989 |
| WO | 99/67347 | 12/1999 |

* cited by examiner

*Primary Examiner*—Roberto Rabago
(74) *Attorney, Agent, or Firm*—Oblon, Spivak, McClelland, Maier & Neustadt, P.C.

(57) ABSTRACT

A crystalline higher α-olefin polymer which is obtained from a $C_{10}$ or more α-olefin and satisfies either (1) the melting point (Tm) as measured with a differential scanning calorimeter (DSC) is 20 to 100° C. or (2) in an examination of spin-lattice relaxation time ($T_1$) by solid NMR analysis, a single $T_1$ is observed at the temperatures not lower than the melting point; and a process for producing the α-olefin polymer with a specific metallocene catalyst. The crystalline higher α-olefin polymer is excellent in low-temperature characteristics, rigidity, heat resistance, compatibility with lubricating oils, mixability with inorganic fillers, and secondary processability.

18 Claims, No Drawings

CRYSTALLINE POLYMER OF HIGHER α-OLEFIN AND PROCESS FOR PRODUCING THE SAME

TECHNICAL FIELD

The present invention relates to a crystalline polymer of a higher α-olefin having 10 or more carbon atoms which are useful as resin modifiers, components of tackifiers, adhesives or lubricating oils, organic and inorganic composite materials, heat accumulators, modifiers for fuel oils such as light oils, modifiers for asphalt, or high-performance waxes, and a process for producing the same

BACKGROUND ART

Hitherto, there have been made various studies concerning polymerization of higher α-olefins having 10 or more carbon using mainly Ziegler/Natta catalysts.

For instance, the above studies have been reported in "Polymer J.", 10, 619, (1978), "Macromol. Chem.", 190, 2683 (1989), "Makromol. Chem., Rapid Comm.", 13, 447 (1992), Japanese Patent Application Laid-open No. Hei 7-145205, etc.

However, the higher α-olefin polymers described in these literatures tend to have a low molecular weight as well as a high melting point due to a high regularity thereof, and further tend to exhibit a non-uniformity owing to existence of two melting points thereof, etc.

In addition, in "Macromol. Sci. Pure Appl. Chem.", A35, 473 (1998), "J. Polym. Sci.", A, 38, 233 (2000), "Macromol. Mater. Eng.", 286, 480 (2001) and "Macromol. Matr. Eng.", 286, 350 (2001), it is described that higher α-olefin polymers are produced in the presence of homogeneous catalysts called metallocene catalysts.

However, the polymers produced in the presence of such homogeneous catalysts also fail to exhibit a sufficiently high molecular weight, and have a high melting point due to a high regularity thereof, and further show a non-uniformity owing to existence of two melting points, similarly to the above-described polymers obtained using the heterogeneous catalysts.

The polymers having a plurality of melting points tend to be non-uniform in crystal size, etc., which may result in occurrence of stickiness.

Further, when such polymers are blended as a modifier with other resins, the resultant blend tends to be non-uniform, thereby failing to modify properties of the resins as desired.

Also, in the applications such as heat accumulating agents, in order to enhance a heat accumulating efficiency, it is required that resins used therein cause abrupt exothermic or endothermic reaction due to abrupt melting or crystallization thereof at a specific temperature. Therefore, it will be difficult to use the above non-uniform resins in such applications.

Accordingly, an object of the present invention is to provide a crystalline higher α-olefin polymer that is excellent in compatibility with thermoplastic resins, especially polyolefins, compatibility with lubricating oils, fuel oils or waxes, mixability with inorganic fillers and fabricability (secondary processability) and has a narrow melting or crystallization temperature range, and a process producing the same.

DISCLOSURE OF THE INVENTION

As a result of extensive researches for achieving the above object, the inventors have found that crystalline resins obtained from higher α-olefins having 10 or more carbon atoms whose melting point (Tm) lies in a specific range as measured by DSC, can meet the above object, and such polymers can be produced in the presence of specific metallocene catalysts. The present invention has been accomplished based on this finding.

Thus, the present invention provides the following crystalline higher α-olefin polymer as well as the following process for producing the crystalline higher α-olefin polymer.

1. (1) A crystalline higher α-olefin polymer obtained from a higher α-olefin, having 10 or more carbon atoms, which satisfies any of the following requirements (2A) and (2B):

(2A) having a melting point (TmD) defined as a top of a peak observed in a melting endothermic curve obtained by a differential scanning calorimeter (DSC) when a sample is held in a nitrogen atmosphere at −10° C. for 5 min and then heated to 190° C. at a temperature rise rate of 10° C./min, and further having a melting point (Tm) of 20 to 100° C., the melting point (Tm) being defined as a top of a peak observed as a single peak in a melting endothermic curve obtained when the sample is further held at 190° C. for 5 min, cooled to −10° C. at a temperature drop rate of 5° C./min, held at −10° C. for 5 min, and then heated again to 190° C. at a temperature rise rate of 10° C./min; and (2B) having a single spin-lattice relaxation time $T_1$ observed at a temperature not lower than the melting point when the spin-lattice relaxation time ($T_1$) is measured by solid NMR analysis.

2. The crystalline higher α-olefin polymer according to the above aspect 1, wherein said polymer has a weight-average molecular weight (Mw) of 1,000 to 10,000,000 as measured by gel permeation chromatography (GPC).

3. The crystalline higher α-olefin polymer according to the above aspect 1, wherein said polymer has a molecular weight distribution (Mw/Mn) of 5.0 or lower as measured by gel permeation chromatography (GPC).

4. The crystalline higher α-olefin polymer according to the above aspect 1, wherein said polymer has a stereoregularity index M2 of 50 mol % or higher.

5. A process for producing the crystalline higher α-olefin polymer as defined in the above aspect 1, comprising:

polymerizing a higher α-olefin having 10 or more carbon atoms, in the presence of a polymerization catalyst comprising:

(A) a transition metal compound represented by the following general formula (I):

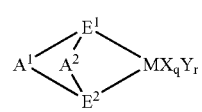

(I)

wherein M is a metal element belonging to Groups 3 to 10 or lanthanoid of the Period Table;

$E^1$ and $E^2$ are independently a ligand selected from the group consisting of substituted cyclopentadienyl, indenyl, substituted indenyl, heterocyclopentadienyl, substituted heterocyclopentadienyl, amide group, phosphide group, hydrocarbon groups and silicon-containing groups, which form a cross-linked structure via $A^1$ and $A^2$ and may be same or different from each other;

X is a ligand capable of forming a σ-bond with the proviso that when a plurality of X groups are present, these groups may be same or different from each other, and may be cross-linked with the other X group, $E^1$, $E^2$ or Y;

Y is a Lewis base with the proviso that when a plurality of Y groups are present, these groups may be same or different from each other, and may be cross-linked with the other Y group, $E^1$, $E^2$ or X;

$A^1$ and $A^2$ are divalent cross-linking groups capable of bonding the two ligands $E^1$ and $E^2$ to each other which may be same or different, and are independently a $C_1$ to $C_{20}$ hydrocarbon group, a $C_1$ to $C_{20}$ halogen-containing hydrocarbon group, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$— or —AlR$^1$— wherein $R^1$ is a hydrogen atom, a halogen atom, a $C_1$ to $C_{20}$ hydrocarbon group or a $C_1$ to $C_{20}$ halogen-containing hydrocarbon group;

q is an integer of 1 to 5 given by the formula:
[(valence of M)−2)]; and (B) at least one component selected from the group consisting of (B-1) a compound capable of forming an ionic complex by reacting with said transition metal compound (A) or derivatives thereof, and (B-2) aluminoxane.

BEST MODE FOR CARRYING OUT THE INVENTION

The present invention will be described in detail below.

First, the crystalline higher α-olefin polymer of the present invention contains as a constituting monomer, a higher α-olefin having 10 or more carbon atoms in an amount of 50 mol % or higher, preferably 70 to 100 mol % and more preferably 85 to 100 mol %. Most preferably, the crystalline higher α-olefin polymer is composed of only the higher α-olefin having 10 or more carbon atoms.

If the content of the higher α-olefin having 10 or more carbon atoms is less than 50 mol %, the resultant polymer tends to fail to show a sufficient crystallinity, and have a too high melting point, resulting in poor compatibility with various substances.

Examples of the higher α-olefin having 10 or more carbon atoms include 1-decene, 1-undecene, 1-dodecene, 1-tridecene, 1-tetradecene, 1-pentadecene, 1-hexadecene, 1-heptadecene, 1-octadecene, 1-nonadecene and 1-eicosene. In the present invention, these higher α-olefins may be used alone or in the form of a mixture of any two or more thereof.

If the number of carbon atoms contained in the α-olefin used as a raw monomer of the crystalline higher α-olefin polymer according to the present invention is less than 10, the resultant polymer tends to exhibit a low crystallinity, resulting in occurrence of stickiness and poor strength.

The upper limit of the number of carbon atoms contained in the higher α-olefin is preferably 25 or lower.

Also, the crystalline higher (α-olefin polymer of the present invention is composed of a crystalline resin satisfying the following requirements (1-1) or (1-2), and preferably also satisfying the following additional requirements (2) to (4):

(1-1) having a melting point (TmD) defined as a top of a peak observed in a melting endothermic curve obtained by a differential scanning calorimeter (DSC) when a sample is held in a nitrogen atmosphere at −10° C. for 5 min and then heated to 190° C. at a temperature rise rate of 10° C./min, and further having a melting point (Tm) of 20 to 100° C., the melting point (Tm) being defined as a top of a peak observed as a single peak in a melting endothermic curve obtained when the sample is further held at 190° C. for 5 min, cooled to −10° C. at a temperature drop rate of 5° C./min, held at −10° C. for 5 min, and then heated again to 190° C. at a temperature rise rate of 10° C./min;

(1-2) having a single spin-lattice relaxation time $T_1$ observed at a temperature not lower than the melting point when the spin-lattice relaxation time ($T_1$) is measured by solid NMR analysis;

(2) having a weight-average molecular weight (Mw) of 1,000 to 10,000,000 as measured by gel permeation chromatography (GPC);

(3) having a molecular weight distribution (Mw/Mn) of 5.0 or lower as measured by gel permeation chromatography (GPC); and (4) having a stereoregularity index M2 of 50 mol % or higher.

The melting points (TmD and Tm) of the α-olefin polymer of the present invention are measured by a differential scanning calorimeter (DSC).

These melting points (TmD and Tm) are respectively defined as follows. That is, the melting point (TmD) is defined as a top of a peak observed in a melting endothermic curve obtained when a sample is held in a nitrogen atmosphere at −10° C. for 5 min and then heated to 190° C. at a temperature rise rate of 10° C./min. The melting point (Tm) is defined as a top of a peak observed as a single peak in a melting endothermic curve obtained when the sample is further held at 190° C. for 5 min, cooled to −10° C. at a temperature drop rate of 5° C./min, held at −10° C. for 5 min, and then heated again to 190° C. at a temperature rise rate of 10° C./min.

The thus defined melting point (Tm) of the α-olefin polymer of the present invention is in the range of 20 to 100° C., preferably 20 to 80° C. and more preferably 25 to 55° C.

The α-olefin polymer of the present invention which satisfies the above requirements can be prevented from undergoing occurrence of stickiness, and can show excellent storage stability and fabricability (secondary processability) as well as excellent low-temperature processability since the polymer can be uniformly melt even at a low temperature.

The spin-lattice relaxation time ($T_1$) is described later.

The α-olefin polymer of the present invention has a weight-average molecular weight (Mw) of preferably 1,000 to 10,000,000 and more preferably 10,000 to 10,000,000 as measured by gel permeation chromatography (GPC).

If the weight-average molecular weight (Mw) is less than 1,000, the resultant polymer tends to be deteriorated in strength. If the weight-average molecular weight (Mw) exceeds 10,000,000, the resultant polymer tends to be deteriorated in moldability and kneadability.

The α-olefin polymer of the present invention also has a molecular weight distribution (Mw/Mn) of preferably 5.0 or lower, more preferably 1.5 to 3.5 and most preferably 1.5 to 3.0 as measured by gel permeation chromatography (GPC).

If the molecular weight distribution (Mw/Mn) exceeds 5.0, the resultant polymer tends to exhibit a broad composition distribution, resulting in poor surface properties, especially occurrence of stickiness, and poor strength thereof.

Meanwhile, the molecular weight distribution (Mw/Mn) is calculated from the weight-average molecular weight Mw and number-average molecular weight Mn in terms of polystyrene which are measured by GPC using the following apparatus and conditions:

GPC Measuring Apparatus:
Column: TOSO GMHHR-H(S)HT
Detector: RI Detector "WATERS 150C" for liquid chromatogram
Measuring Conditions:
Solvent: 1,2,4-trichlorobenzene;
Measuring temperature: 145° C.;
Flow rate: 1.0 mL/min;
Sample concentration: 2.2 mg/mL;
Amount charged: 160 μL;
Calibration curve: Universal Calibration; and
Analytic program: HT-GPC (Ver. 10)

The α-olefin polymer of the present invention has a good isotactic structure, and a stereoregularity index M2 of preferably 50 mol % or higher, more preferably 50 to 90 mol %, still more preferably 55 to 85 mol % and further still more preferably 55 to 75 mol %.

Thus, when the stereoregularity of the α-olefin polymer is controlled to a medium or higher level, especially to a medium level, it becomes possible to attain the aimed object of the present invention.

If the stereoregularity index M2 is less than 50 mol %, the obtained polymer exhibits an atactic or syndiotactic structure, and is in an amorphous state or deteriorated in crystallinity, resulting in poor surface properties, especially occurrence of stickiness, and deteriorated strength.

The stereoregularity index M2 is determined according to the method proposed in T. Asakura, M. Demura and Y. Nishiyama, "Macromolecules", 24, 2334 (1991).

More specifically, the stereoregularity index M2 is determined using such a phenomenon that the carbon of $CH_2$ located at an α-position of the side chain is observed in a split state in $^{13}C$ NMR spectrum thereof owing to difference in stereoregularity.

The larger M2 value indicates a higher isotacticity.

Meanwhile, the $^{13}C$ NMR spectrum measurement is carried out using the following apparatus under the following conditions.

Apparatus: "EX400" available from Nippon Denshi Co., Ltd.;
Measuring temperature: 130° C.;
Pulse width: 45°;
Cumulative frequency: 1,000 times; and
Solvent: mixed solvent of 1,2,4-trichlorobenzene and heavy benzene (volume ratio: 90:10);

The stereoregularity index M2 is calculated as follows.

Six large absorption peaks attributed to the mixed solvent are observed in the range of 127 to 135 ppm.

The value of the fourth peak from the low magnetic field side of the six peaks is 131.1 ppm, and is used as a standard of chemical shift.

At this time, the absorption peaks attributed to the carbon of $CH_2$ located at an α-position of the side chain are observed in the range of about 34 to 37 ppm.

The stereoregularity index M2 (mol %) is calculated according to the following formula:

$$M2=[(\text{Integrated Intensity of 36.2 to 35.3 ppm})/(\text{Integrated Intensity of 36.2 to 34.5 ppm})]\times 100$$

In the solid NMR method, the spin-lattice relaxation time [$T_1$(ms)] is measured at the respective temperatures by inversion recovery method (180°-τ-90° pulse method) using the following solid NMR measuring apparatus:

Apparatus: (pulse NMR) spectrometer "JNM-MU25" available from JEOL Inc.

Nucleus to be measured: hydrogen nucleus ($^1H$)
Measuring frequency: 25 MHz
90° pulse width: 2.0 μs In general, even though crystal and amorphous phases are present in a mixed state in the crystalline polymer, if the velocity of spin diffusion between the phases is high, the relaxation times are equalized, so that a single $T_1$, is observed.

However, if the spin diffusion velocity between the phases is lowered owing to melting, etc., a plurality of the relaxation times $T_1$ tend to be observed.

This phenomenon tends to occur owing to heterogeneous system, large crystal size, broad size distribution, etc.

That is, the observation of a single $T_1$, at a temperature not lower than the melting point means homogeneous system, small crystal size and narrow size distribution.

The polymer exhibiting a homogeneous system and a small crystal size not only has a less stickiness and a high transparency, but also can be uniformly blended as a modifier with other materials, resulting in advantages such as excellent modified properties of the resins.

Next, the α-olefin polymer according to the present invention is produced using the following metallocene catalysts. Of these catalysts, especially preferred are $C_2$-symmetric and $C_1$-symmetric transition metal compounds capable of synthesizing isotactic polymers.

That is, in the process of the present invention, a crystalline polymer of a higher α-olefin having 10 or more carbon atoms is produced by polymerizing the higher α-olefin having 10 or more carbon atoms in the presence of a polymerization catalyst comprising (A) a transition metal compound represented by the following general formula (I), and (B) at least one component selected from the group consisting of (B-1) a compound capable of forming an ionic complex by reacting with said transition metal compound (A) or derivatives thereof, and (B-2) aluminoxane.

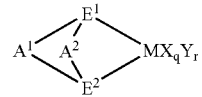

(I)

wherein M is a metal element belonging to Groups 3 to 10 or lanthanoid of the Period Table;

$E^1$ and $E^2$ are independently a ligand selected from the group consisting of substituted cyclopentadienyl, indenyl, substituted indenyl, heterocyclopentadienyl, substituted heterocyclopentadienyl, amide group, phosphide group, hydrocarbon groups and silicon-containing groups, which form a cross-linked structure via $A^1$ and $A^2$ and may be same or different from each other;

X is a ligand capable of forming a σ-bond with the proviso that when a plurality of X groups are present, these groups may be same or different from each other, and may be cross-linked with the other X group, $E^1$, $E^2$ or Y;

Y is a Lewis base with the proviso that when a plurality of Y groups are present, these groups may be same or different from each other, and may be cross-linked with the other Y group, $E^1$, $E^2$ or X;

$A^1$ and $A^2$ are divalent cross-linking groups capable of bonding the two ligands $E^1$ and $E^2$ to each other which may be same or different from each other, and are independently a $C_1$ to $C_{20}$ hydrocarbon group, a $C_1$ to $C_{20}$ halogen-containing hydrocarbon group, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$— or —AlR$^1$— wherein R$^1$ is a hydrogen atom, a halogen atom, a C$_1$ to C$_{20}$ hydrocarbon group or a C$_1$ to C$_{20}$ halogen-containing hydrocarbon group;

q is an integer of 1 to 5 given by the formula:
v[(valence of M)–2]; and
r is an integer of 0 to 3.

In the above general formula (I), M represents a metal element belonging to Groups 3 to 10 or lanthanoid of the Period Table. Specific examples of the metal element include titanium, zirconium, hafnium, yttrium, vanadium, chromium, manganese, nickel, cobalt, palladium and lanthanoid metals. Of these metal elements, preferred are titanium, zirconium and hafnium from the standpoint of a good catalytic activity for polymerization of olefins.

E$^1$ and E$^2$ are independently a ligand selected from the group consisting of substituted cyclopentadienyl, indenyl, substituted indenyl, heterocyclopentadienyl, substituted heterocyclopentadienyl, amide group (—N<), phosphide group (—P<), hydrocarbon groups (>CR—, >C<) and silicon-containing groups (>SiR—, >Si<) wherein R is hydrogen, a C$_1$–C$_{20}$ hydrocarbon group or a hetero atom-containing group, and form a cross-linked structure via A$^1$ and A$^2$.

The ligands E$^1$ and E$^2$ may be same or different from each other.

Of these ligands E$^1$ and E$^2$, preferred are substituted cyclopentadienyl, indenyl and substituted indenyl.

X represents a ligand capable of forming a σ-bond. When a plurality of X groups are present, these X groups may be same or different from each other, and may be cross-linked with the other X group, E$^1$, E$^2$ or Y.

Specific examples of the ligand X include a halogen atom, a C$_1$ to C$_{20}$ hydrocarbon group, C$_1$ to C$_{20}$ alkoxy, C$_6$ to C$_{20}$ arylalkoxy, a C$_1$ to C$_{20}$ amide group, a C$_1$ to C$_{20}$ silicon-containing group, a C$_1$ to C$_{20}$ phosphide group, a C$_1$ to C$_{20}$ sulfide group and C$_1$ to C$_{20}$ acyl.

Y represents a Lewis base. When a plurality of Y groups are present, these Y groups may be same or different from each other, and may be cross-linked with the other Y group, E$^1$, E$^2$ or X.

Specific examples of the Lewis base as Y include amines, ethers, phosphines and thioethers.

A$^1$ and A$^2$ are divalent cross-linking groups capable of bonding the two ligands to each other which may be same or different from each other, and independently represent a C$_1$ to C$_{20}$ hydrocarbon group, a C$_1$ to C$_{20}$ halogen-containing hydrocarbon group, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$— or —AlR$^1$— wherein R$^1$ is a hydrogen atom, a halogen atom, a C$_1$ to C$_{20}$ hydrocarbon group or a C$_1$ to C$_{20}$ halogen-containing hydrocarbon group.

The above cross-linking groups include, for example, compounds represented by the following general formula:

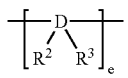

wherein D is carbon, silicon or tin; R$^2$ and R$^3$ are independently a hydrogen atom or a C$_1$ to C$_{20}$ hydrocarbon group, and may be same or different from each other and may be bonded to each other to form a ring; and e is an integer of 1 to 4. Specific examples of the cross-linking groups represented by the above formula include methylene, ethylene, ethylidene, propylidene, isopropylidene, cyclohexylidene, 1,2-cyclohexylene, vinylidene (CH$_2$=C=), dimethylsilylene, diphenylsilylene, methylphenylsilylene, dimethylgermylene, dimethylstannylene, tetramethyldisilylene and diphenyldisilylene.

Of these cross-linking groups, preferred are ethylene, isopropylidene and dimethylsilylene.

The symbol q is an integer of 1 to 5 given by the formula:
[(valence of M)–2], and
r is an integer of 0 to 3.

Of these transition metal compounds represented by the above general formula (I), preferred are transition metal compounds having as a ligand, a double cross-linking type biscyclopentadienyl derivative represented by the following general formula (II):

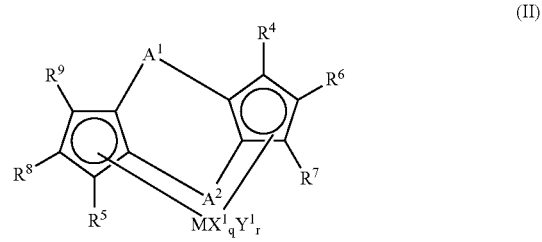

In the above general formula (II), M, A$^1$, A$^2$, q and r have the same definitions as described in the above formula (I).

X$^1$ is a ligand capable of forming a σ-bond, and when a plurality of X$^1$ groups are present, these X$^1$ groups may be same or different from each other and may be cross-linked with the other X$^1$ group or Y$^1$.

Specific examples of the X$^1$ groups are the same as exemplified above as to X of the general formula (I).

Y$^1$ is a Lewis base, and when a plurality of Y$^1$ groups are present, these Y$^1$ groups may be same or different from each other and may be cross-linked with the other Y$^1$ group or X$^1$.

Specific examples of the Y$^1$ groups are the same as exemplified above as to Y of the general formula (I).

R$^4$ to R$^9$ are independently a hydrogen atom, a halogen atom, a C$_1$ to C$_{20}$ hydrocarbon group, a C$_1$ to C$_{20}$ halogen-containing hydrocarbon group, a silicon-containing group or a hetero atom-containing group. However, at least one of R$^4$ to R$^9$ is required to be a group other than hydrogen.

Also, R$^4$ to R$^9$ may be same or different from each other, and adjacent two thereof may be bonded to each other to form a ring.

In particular, R$^6$ and R$^7$ as well as R$^8$ and R$^9$ are preferably bonded to each other to form a ring.

R$^4$ and R$^5$ are preferably selected from groups containing a hetero atom such as oxygen, halogen and silicon, because the resultant catalyst can exhibit a high polymerization activity.

The transition metal compound having double cross-linking type biscyclopentadienyl derivatives as ligands preferably contains silicon in the crosslinking group between the ligands.

Specific examples of the transition metal compounds represented by the general formula (I) include (1,2'-ethylene)(2,1'-ethylene)-bis(indenyl)zirconium dichloride, (1,2'-methylene)(2,1'-methylene)-bis(indenyl)zirconium dichloride, (1,2'-isopropylidene)(2,1'-isopropylidene)-bis(indenyl)zirconium dichloride, (1,2'-ethylene)(2,1'-ethylene)-bis(3-methylindenyl)zirconium dichloride, (1,2'-ethylene)(2,1'- ethylene)-bis(4,5-benzoindenyl)zirconium dichloride, (1,2'-ethylene)(2,1'-ethylene)-bis(4-isopropylindenyl)zirconium dichloride, (1,2'-ethylene)(2,1'-ethylene)-bis(5,6-dimethylindenyl)zirconium dichloride, (1,2'-ethylene)(2,1'-ethylene)-bis(4,7-diisopropylindenyl)zirconium dichloride, (1,2'-ethylene)(2,1'-ethylene)-bis(4-phenylindenyl)zirconium dichloride, (1,2'-ethylene)(2,1'-ethylene)-bis(3-methyl-4-isopropylindenyl)zirconium dichloride, (1,2'-ethylene)(2,1'-ethylene)-bis(5,6-benzoindenyl)zirconium dichloride, (1,2'-ethylene)(2,1'-isopropylidene)-bis(indenyl)zirconium dichloride, (1,2'-methylene)(2,1'-ethylene)-bis(indenyl)zirconium dichloride, (1,2'-methylene)(2,1'-isopropylidene)-bis(indenyl)zirconium dichloride, (1,2'-dimethylsilylene)(2,1'-dimethylsilylene)-bis(indenyl)zirconium dichloride, (1,2'-dimethylsilylene)(2,1'-dimethylsilylene)-bis(3-methylindenyl)zirconium dichloride, (1,2'-dimethylsilylene)(2,1'-dimethylsilylene)-bis(3-n-butylindenyl)zirconium dichloride, (1,2'-dimethylsilylene)(2,1'-dimethylsilylene)-bis(3-i-propylindenyl)zirconium dichloride, (1,2'-dimethylsilylene)(2,1'-dimethylsilylene)-bis(3-trimethylsilylmethylindenyl)zirconium dichloride, (1,2'-dimethylsilylene)(2,1'-dimethylsilylene)-bis(3-phenylindenyl)zirconium dichloride, (1,2'-dimethylsilylene)(2,1'-dimethylsilylene)-bis(4,5-benzoindenyl)zirconium dichloride, (1,2'-dimethylsilylene)(2,1'-dimethylsilylene)-bis(4-isopropylindenyl)zirconium dichloride, (1,2'-dimethylsilylene)(2,1'-dimethylsilylene)-bis(5,6-dimethylindenyl)zirconium dichloride, (1,2'-dimethylsilylene)(2,1'-dimethylsilylene)-bis(4, 7-di-i-propylindenyl)zirconium dichloride, (1,2'-dimethylsilylene)(2,1'-dimethylsilylene)-bis(4-phenylindenyl)zirconium dichloride, (1,2'-dimethylsilylene)(2,1'-dimethylsilylene)-bis(3-methyl-4-i-propylindenyl)zirconium dichloride, (1,2'-dimethylsilylene)(2,1'-dimethylsilylene)-bis(5,6-benzoindenyl)zirconium dichloride, (1,2'-dimethylsilylene)(2,1'-isopropylidene)-bis(indenyl)zirconium dichloride, (1,2'-dimethylsilylene)(2,1'-isopropylidene)-bis(3-methylindenyl)zirconium dichloride, (1,2'-dimethylsilylene)(2,1'-isopropylidene)-bis(3-i-propylindenyl)zirconium dichloride, (1,2'-dimethylsilylene)(2,1'-isopropylidene)-bis(3-n-butylindenyl)zirconium dichloride, (1,2'-dimethylsilylene)(2,1'-isopropylidene)-bis(3-trimethylsilylmethylindenyl)zirconium dichloride, (1,2'-dimethylsilylene)(2,1'-isopropylidene)-bis(3-trimethylsilylindenyl)zirconium dichloride, (1,2'-dimethylsilylene)(2,1'-isopropylidene)-bis(3-phenylindenyl)zirconium dichloride, (1,2'-dimethylsilylene)(2,1'-methylene)-bis(indenyl)zirconium dichloride, (1,2'-dimethylsilylene)(2,1'-methylene)-bis(3-methylindenyl)zirconium dichloride, (1,2'-dimethylsilylene)(2,1'-methylene)-bis(3-i-propylindenyl)zirconium dichloride, (1,2'-dimethylsilylene)(2,1'-methylene)-bis(3-n-butylindenyl)zirconium dichloride, (1,2'-dimethylsilylene)(2,1'-methylene)-bis(3-trimethylsilylmethylindenyl)zirconium dichloride, (1,2'-dimethylsilylene)(2,1'-methylene)-bis(3-trimethylsilylindenyl)zirconium dichloride, (1,2'-diphenylsilylene)(2,1'-methylene)-bis(indenyl)zirconium dichloride, (1,2'-diphenylsilylene)(2,1'-methylene)-bis(3-methylindenyl)zirconium dichloride, (1,2'-diphenylsilylene)(2,1'-methylene)-bis(3-i-propylindenyl)zirconium dichloride, (1,2'-diphenylsilylene)(2,1'-methylene)-bis(3-n-butylindenyl)zirconium dichloride, (1,2'-diphenylsilylene)(2,1'-methylene)-bis(3-trimethylsilylmethylindenyl)zirconium dichloride, (1,2'-diphenylsilylene)(2,1'-methylene)-bis(3-trimethylsilylindenyl)zirconium dichloride, (1,2'-dimethylsilylene)(2,1'-dimethylsilylene)(3-methylcyclopentadienyl) (3'-methylcyclopentadienyl)zirconium dichloride, (1,2'-dimethylsilylene)(2,1'-isopropylidene)(3-methylcyclopentadienyl) (3'-methylcyclopentadienyl)zirconium dichloride, (1,2'-dimethylsilylene)(2,1'-ethylene)(3-methylcyclopentadienyl) (3'-methylcyclopentadienyl)zirconium dichloride, (1,2'-ethylene)(2,1'-methylene)(3-methylcyclopentadienyl) (3'-methylcyclopentadienyl)zirconium dichloride, (1,2'-ethylene)(2,1'-isopropylidene)(3-methylcyclopentadienyl) (3'-methylcyclopentadienyl)zirconium dichloride, (1,2'-methylene)(2,1'-methylene)(3-methylcyclopentadienyl) (3'-methylcyclopentadienyl)zirconium dichloride, (1,2'-methylene)(2,1'-isopropylidene)(3-methylcyclopentadienyl) (3'-methylcyclopentadienyl)zirconium dichloride, (1,2'-isopropylidene)(2,1'-isopropylidene)(3-methylcyclopentadienyl) (3'-methylcyclopentadienyl)zirconium dichloride, (1,2'-dimethylsilylene)(2,1'-dimethylsilylene)(3,4-dimethylcyclopentadienyl) (3',4'-dimethylcyclopentadienyl)zirconium dichloride, (1,2'-dimethylsilylene)(2,1'-isopropylidene)(3,4-dimethylcyclopentadienyl) (3',4'-dimethylcyclopentadienyl)zirconium dichloride, (1,2'-dimethylsilylene)(2,1'-ethylene)(3,4-dimethylcyclopentadienyl) (3',4'-dimethylcyclopentadienyl) zirconium dichloride, (1,2'-ethylene)(2,1'-methylene)(3,4-dimethylcyclopentadienyl) (3',4'-dimethylcyclopentadienyl) zirconium dichloride, (1,2'-ethylene)(2,1'-isopropylidene) (3,4-dimethylcyclopentadienyl) (3',4'-dimethylcyclopentadienyl)zirconium dichloride, (1,2'-methylene)(2,1'-methylene)(3,4-dimethylcyclopentadienyl) (3',4'-dimethylcyclopentadienyl)zirconium dichloride, (1,2'-methylene)(2,1'-isopropylidene)(3,4-dimethylcyclopentadienyl) (3',4'-dimethylcyclopentadienyl)zirconium dichloride, (1,2'-isopropylidene)(2,1'-isopropylidene)(3,4-dimethylcyclopentadienyl) (3',4'-dimethylcyclopentadienyl)zirconium dichloride, (1,2'-dimethylsilylene)(2,1'-dimethylsilylene)(3-methyl-5-ethylcyclopentadienyl) (3'-methyl-5'-ethylcyclopentadienyl)zirconium dichloride, (1,2'-dimethylsilylene)(2,1'-dimethylsilylene)(3-methyl-5-ethylcyclopentadienyl) (3'-methyl-5'-ethylcyclopentadienyl)zirconium dichloride, (1,2'-dimethylsilylene)(2,1'-dimethylsilylene)(3-methyl-5-isopropylcyclopentadienyl) (3'-methyl-5'-isopropylcyclopentadienyl)zirconium dichloride, (1,2'-dimethylsilylene)(2,1'-dimethylsilylene)(3-methyl-5-n-butylcyclopentadienyl) (3'-methyl-5'-n-butylcyclopentadienyl) zirconium dichloride, (1,2'-dimethylsilylene)(2,1'-dimethylsilylene)(3-methyl-5-phenylcyclopentadienyl) (3'-methyl-5'-phenylcyclopentadienyl)zirconium dichloride, (1,2'-dimethylsilylene)(2,1'-isopropylidene)(3-methyl-5-ethylcyclopentadienyl) (3'-methyl-5'-ethylcyclopentadienyl)zirconium dichloride, (1,2'-dimethylsilylene)(2,1'-isopropylidene)(3-methyl-5-i-propylcyclopentadienyl) (3'-methyl-5'-i-propylcyclopentadienyl)zirconium dichloride, (1,2'-dimethylsilylene)(2,1'-isopropylidene)(3-methyl-5-n-butylcyclopentadienyl) (3'-methyl-5'-n-butylcyclopentadienyl)zirconium dichloride, (1,2'-dimethylsilylene)(2,1'-isopropylidene)(3-methyl-5-phenylcyclopentadienyl) (3'-methyl-5'-phenylcyclopentadienyl)zirconium dichloride, (1,2'-dimethylsilylene)(2,1'-ethylene)(3-methyl-5-ethylcyclopentadienyl) (3'-methyl-5'-ethylcyclopentadienyl)zirconium dichloride, (1,2'-dimethylsilylene)(2,1'-ethylene)(3-methyl-5-i-propylcyclopentadienyl) (3'-methyl-5'-i-propylcyclopentadienyl)zirconium dichloride, (1,2'-dimethylsilylene)(2,1'-ethylene)(3-methyl-5-n-butylcyclopentadienyl) (3'-methyl-5'-n-butylcyclopentadienyl)zirconium dichloride, (1,2'-dimethylsilylene)(2,1'-ethylene)(3-methyl-5-phenylcyclopentadienyl) (3'-methyl-5'-phenylcyclopentadienyl)zirconium dichloride, (1,2'-dimethylsilylene)(2,1'-methylene)(3-methyl-5-ethylcyclopentadienyl) (3'-methyl-5'-ethylcyclopentadienyl)

zirconium dichloride, (1,2'-dimethylsilylene)(2,1'-methylene)(3-methyl-5-i-propylcyclopentadienyl) (3'-methyl-5'-i-propylcyclopentadienyl)zirconium dichloride, (1,2'-dimethylsilylene)(2,1'-methylene)(3-methyl-5-n-butylcyclopentadienyl) (3'-methyl-5'-n-butylcyclopentadienyl)zirconium dichloride, (1,2'-dimethylsilylene)(2,1'-methylene)(3-methyl-5-phenylcyclopentadienyl) (3'-methyl-5'-phenylcyclopentadienyl)zirconium dichloride, (1,2'-ethylene)(2,1'-methylene)(3-methyl-5-i-propylcyclopentadienyl) (3'-methyl-5'-i-propylcyclopentadienyl)zirconium dichloride, (1,2'-ethylene)(2,1'-isopropylidene)(3-methyl-5-i-propylcyclopentadienyl) (3'-methyl-5'-i-propylcyclopentadienyl)zirconium dichloride, (1,2'-methylene)(2,1'-methylene)(3-methyl-5-i-propylcyclopentadienyl) (3'-methyl-5'-i-propylcyclopentadienyl)zirconium dichloride, (1,2'-methylene)(2,1'-isopropylidene)(3-methyl-5-i-propylcyclopentadienyl) (3'-methyl-5'-i-propylcyclopentadienyl)zirconium dichloride, (1,1'-dimethylsilylene) (2,2'-dimethylsilylene) bisindenyl zirconium dichloride, (1,1'-diphenylsilylene) (2,2'-dimethylsilylene) bisindenyl zirconium dichloride, (1,1'-dimethylsilylene) (2,2'-dimethylsilylene) bisindenyl zirconium dichloride, (1,1'-diisopropylsilylene) (2,2'-dimethylsilylene) bisindenyl zirconium dichloride, (1,1'-dimethylsilylene) (2,2'-diisopropylsilylene) bisindenyl zirconium dichloride, (1,1'-dimethylsilyleneindenyl) (2,2'-dimethylsilylene-3-trimethylsilylindenyl) zirconium dichloride, (1,1'-diphenylsilyleneindenyl) (2,2'-diphenylsilylene-3-trimethylsilylindenyl) zirconium dichloride, (1,1'-diphenylsilyleneindenyl) (2,2'-diphenylsilylene-3-trimethylsilylindenyl) zirconium dichloride, (1,1'-dimethylsilylene) (2,2'-dimethylsilylene) (indenyl)(3-trimethylsilylindenyl) zirconium dichloride, (1,1'-diphenylsilylene) (2,2'-diphenylsilylene) (indenyl)(3-trimethylsilylindenyl) zirconium dichloride, (1,1'-diphenylsilylene) (2,2'-dimethylsilylene) (indenyl)(3-trimethylsilylindenyl) zirconium dichloride, (1,1'-dimethylsilylene) (2,2'-diphenylsilylene) (indenyl)(3-trimethylsilylindenyl) zirconium dichloride, (1,1'-diisopropylsilylene) (2,2'-dimethylsilylene) (indenyl)(3-trimethylsilylindenyl) zirconium dichloride, (1,1'-dimethylsilylene) (2,2'-diisopropylsilylene) (indenyl)(3-trimethylsilylindenyl) zirconium dichloride, (1,1'-diisopropylsilylene) (2,2'-diisopropylsilylene) (indenyl)(3-trimethylsilylindenyl) zirconium dichloride, (1,1'-dimethylsilylene) (2,2'-dimethylsilylene) (indenyl)(3-trimethylsilylmethylindenyl) zirconium dichloride, (1,1'-diphenylsilylene) (2,2'-diphenylsilylene) (indenyl)(3-trimethylsilylmethylindenyl) zirconium dichloride, (1,1'-diphenylsilylene) (2,2'-dimethylsilylene) (indenyl)(3-trimethylsilylmethylindenyl) zirconium dichloride, (1,1'-dimethylsilylene) (2,2'-diphenylsilylene) (indenyl)(3-trimethylsilylmethylindenyl) zirconium dichloride, (1,1'-diisopropylsilylene) (2,2'-dimethylsilylene) (indenyl)(3-trimethylsilylmethylindenyl) zirconium dichloride, (1,1'-dimethylsilylene) (2,2'-diisopropylsilylene) (indenyl)(3-trimethylsilylmethylindenyl) zirconium dichloride and (1,1'-diisopropylsilylene) (2,2'-diisopropylsilylene) (indenyl)(3-trimethylsilylmethylindenyl) zirconium dichloride, as well as compounds obtained by replacing zirconium of the above-described compounds with titanium or hafnium, though not limited thereto.

Further, similar compounds containing metal elements belonging to the other Groups or lanthanoid series may also be used in the present invention.

Also, in the above compounds, the (1,1'-) (2,2'-) substituted compounds may be replaced with (1,2'-) (2,1'-) substituted compounds, and the (1,2'-) (2,1'-) substituted compounds may be replaced with (1,1'-) (2,2'-) substituted compounds.

As the component (B-1) contained in the component (B), any suitable compounds can be used as long as they are capable of forming an ionic complex by reacting with the above transition metal compound (A). The compounds suitably used as the component (B-1) are those represented by the following general formulae (III) and (IV):

  (III)

  (IV)

wherein $L^2$ is $M^2$, $R^{11}R^{12}M^3$, $R^{13}_3C$ or $R^{14}M^3$.

In the above general formulae (III) and (IV), $L^1$ represents a Lewis base; $[Z]^-$ represents a non-coordinated anion $[Z^1]^-$ or $[Z^2]^-$ wherein $[Z^1]^-$ is an anion containing a plurality of groups bonded to an element, i.e., $[M^1G^1G^2 \ldots G^f]^-$ wherein $M^1$ is an element selected from the group consisting of elements of Groups 5 to 15, preferably Groups 13 to 15; $G^1$ to $G^f$ are respectively a hydrogen atom, a halogen atom, $C_1$ to $C_{20}$ alkyl, $C_2$ to $C_{40}$ dialkylamino, $C_1$ to $C_{20}$ alkoxy, $C_6$ to $C_{20}$ aryl, $C_6$ to $C_{20}$ arylalkoxy, $C_7$ to $C_{40}$ alkylaryl, $C_7$ to $C_{40}$ arylalkyl, $C_1$ to $C_{20}$ halogen-substituted hydrocarbon group, $C_1$ to $C_{20}$ acyloxy, organometalloid group or $C_2$ to $C_{20}$ hetero atom-containing hydrocarbon group, and at least two of $G^1$ to $G^f$ may be bonded to each other to form a ring; f is an integer given by the formula: [(valence of the $M^1$ as a center metal)+1]; $[Z^2]^-$ is a conjugated base composed of Brønsted acid showing a logarithm of inverse number of acid dissociation constant (pKa) of −10 or lower solely or a combination of the Brønsted acid and a Lewis acid, or a conjugated base of acids generally defined as superstrong acids, and may be coordinated with a Lewis base; $R^{10}$ is a hydrogen atom, $C_1$ to $C_{20}$ alkyl or $C_6$ to $C_{20}$ aryl, alkylaryl or arylalkyl; $R^{11}$ and $R^{12}$ are respectively cyclopentadienyl, substituted cyclopentadienyl, indenyl or fluorenyl; $R^{13}$ is $C_1$ to $C_{20}$ alkyl, aryl, alkylaryl or arylalkyl; $R^{14}$ is a macrocyclic ligand such as tetraphenyl porphyrin and phthalocyanine; k represents an ionic valence of $[L^1-R^{10}]$ or $[L^2]$, i.e., an integer of 1 to 3; a is an integer of 1 or more; b is a number of (k×a); $M^2$ represents an element selected from the group consisting of elements of Groups 1 to 3, 11 to 13 and 17 of the Periodic Table; and $M^3$ represents an element selected from the group consisting of elements of Groups 7 to 12 of the Periodic Table.

Specific examples of the $L^1$ include amines such as ammonia, methyl amine, aniline, dimethyl amine, diethyl amine, N-methyl aniline, diphenyl amine, N,N-dimethyl aniline, trimethyl amine, triethyl amine, tri-n-butyl amine, methyldiphenyl amine, pyridine, p-bromo-N,N-dimethyl aniline and p-nitro-N,N-dimethyl aniline; phosphines such as triethyl phosphine, triphenyl phosphine and diphenyl phosphine; thioethers such as tetrahydrothiophene; esters such as ethyl benzoate; and nitriles such as acetonitrile and benzonitrile.

Specific examples of the $R^{10}$ include hydrogen, methyl, ethyl, benzyl and trityl. Specific examples of the $R^{11}$ and $R^{12}$ include cyclopentadienyl, methyl cyclopentadienyl, ethyl cyclopentadienyl and pentamethyl cyclopentadienyl.

Specific examples of the $R^{13}$ include phenyl and p-tolyl, p-methoxyphenyl. Specific examples of the $R^{14}$ include tetraphenyl porphyrin, phthalocyanine, allyl and methallyl.

Specific examples of the $M^2$ include Li, Na, K, Ag, Cu, Br, I and $I_3$. Specific examples of the $M^3$ include Mn, Fe, Co, Ni and Zn.

In the $[Z^1]^-$, i.e., $[M^1G^1G^2 \ldots G^f]^-$, specific examples of the $M^1$ include B, Al, Si, P, As and Sb. Of these, preferred are B and Al.

Specific examples of the $G^1$ to $G^f$ include dialkylamino groups such as dimethylamino and diethylamino; alkoxy or aryloxy groups such as methoxy, ethoxy, n-butoxy and phenoxy; hydrocarbon groups such as methyl, ethyl, n-propyl, isopropyl, n-butyl, isobutyl, n-octyl, n-eicosyl, phenyl, p-tolyl, benzyl, 4-t-butylphenyl and 3,5-dimethylphenyl; halogen atoms such as fluorine, chlorine, bromine and iodine; hetero atom-containing hydrocarbon groups such as p-fluorophenyl, 3,5-difluorophenyl, pentachlorophenyl, 3,4,5-trifluorophenyl, pentafluorophenyl, 3,5-bis(trifluoromethyl)phenyl and bis(trimethylsilyl)methyl; and organometalloid groups such as pentamethyl antimony, trimethylsilyl, trimethylgermyl, diphenyl arsine, dicyclohexyl antimony and diphenyl boron.

Specific examples of the non-coordinated anion, i.e., the conjugated base $[Z2]^-$ composed of Brønsted acid having a pKa of −10 or lower solely or a combination of the Brønsted acid and a Lewis acid, include trifluoromethanesulfonic acid anion $[(CF_3SO_3)^-]$, bis(trifluoromethanesulfonyl)methyl anion, bis(trifluoromethanesulfonyl)benzyl anion, bis(trifluoromethanesulfonyl)amide, perchloric acid anion $[(ClO_4)^-]$, trifluoroacetic acid anion $[(CF_3CO_2)^-]$, hexafluoroantimony anion $[(SbF_6)^-]$, fluorosulfonic acid anion $[(FSO_3)^-]$, chlorosulfonic acid anion $[(ClSO_3)^-]$, fluorosulfonic acid anion/antimony pentafluoride $[(FSO_3/SbF_5)^-]$, fluorosulfonic acid anion/arsenic pentafluoride $[(FSO_3/AsF_5)^-]$ and trifluoromethanesulfonic acid anion/antimony pentafluoride $[(CF_3SO_3/SbF_5)^-]$.

Specific examples of the ionic compound capable of forming an ionic complex by reacting with the above transition metal compound as the component (A), i.e., the component (B-1), include triethyl ammonium tetraphenylborate, tri-n-butyl ammonium tetraphenylborate, trimethyl ammonium tetraphenylborate, tetraethyl ammonium tetraphenylborate, methyl(tri-n-butyl) ammonium tetraphenylborate, benzyl(tri-n-butyl) ammonium tetraphenylborate, dimethyldiphenyl ammonium tetraphenylborate, triphenyl (methyl) ammonium tetraphenylborate, trimethyl anilinium tetraphenylborate, methyl pyridinium tetraphenylborate, benzyl pyridinium tetraphenylborate, methyl(2-cyanopyridinium) tetraphenylborate, triethyl ammonium tetrakis(pentafluorophenyl)borate, tri-n-butyl ammonium tetrakis(pentafluorophenyl)borate, triphenyl ammonium tetrakis(pentafluorophenyl)borate, tetra-n-butyl ammonium tetrakis(pentafluorophenyl)borate, tetraethyl ammonium tetrakis(pentafluorophenyl)borate, benzyl(tri-n-butyl) ammonium tetrakis(pentafluorophenyl)borate, methyldiphenyl ammonium tetrakis(pentafluorophenyl)borate, triphenyl(methyl) ammonium tetrakis(pentafluorophenyl)borate, methyl anilinium tetrakis(pentafluorophenyl)borate, dimethyl anilinium tetrakis(pentafluorophenyl)borate, trimethyl anilinium tetrakis(pentafluorophenyl)borate, methyl pyridinium tetrakis(pentafluorophenyl)borate, benzyl pyridinium tetrakis(pentafluorophenyl)borate, methyl(2-cyanopyridinium) tetrakis(pentafluorophenyl)borate, benzyl(2-cyanopyridinium) tetrakis(pentafluorophenyl)borate, methyl (4-cyanopyridinium) tetrakis(pentafluorophenyl)borate, triphenyl phosphonium tetrakis(pentafluorophenyl)borate, dimethyl anilinium tetrakis[bis(3,5-di-trifluoromethyl)phenyl]borate, ferrocenium tetraphenylborate, silver tetraphenylborate, trityl tetraphenylborate, tetraphenyl porphyrin manganese tetraphenylborate, ferrocenium tetrakis(pentafluorophenyl)borate, (1.1'-dimethyl ferrocenium) tetrakis (pentafluorophenyl)borate, decamethyl ferrocenium tetrakis (pentafluorophenyl)borate, silver tetrakis (pentafluorophenyl)borate, trityl tetrakis(pentafluorophenyl) borate, lithium tetrakis(pentafluorophenyl)borate, sodium tetrakis(pentafluorophenyl)borate, tetraphenyl porphyrin manganese tetrakis(pentafluorophenyl)borate, silver tetrafluoroborate, silver hexafluorophosphate, silver hexafluoroarsenate, silver perchlorate, silver trifluoroacetate and silver trifluoromethanesulfonate.

These ionic compounds as the components (B-1) may be used alone or in the form of a mixture of any two or more thereof.

Examples of the aluminoxanes as the component (B-2) include chain-like aluminoxanes represented by the following general formula (V):

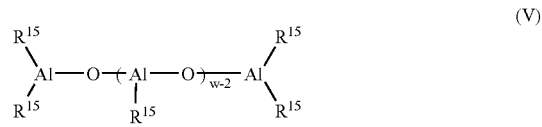

wherein $R^{15}$ is a hydrocarbon group such as $C_1$ to $C_{20}$, preferably $C_1$ to $C_{12}$ alkyl, alkenyl, aryl and arylalkyl, or a halogen atom; w represents an average polymerization degree, i.e., an integer of usually 2 to 50, preferably 2 to 40; the respective $R^{15}$ groups may be the same or different from each other, and cyclic aluminoxanes represented by the following general formula (VI):

wherein $R^{15}$ and w are the same as defined above.

The above aluminoxanes may be produced by contacting alkyl aluminum with a condensing agent such as water. The contact method is not particularly limited, and these compounds may be reacted with each other by any known contact methods. For example, there may be used (1) the method of dissolving the organoaluminum compound in an organic solvent, and then contacting the thus obtained solution with water; (2) the method of adding the organoaluminum compound at an initial stage of the polymerization, and then adding water at a later stage of the polymerization; (3) the method of reacting crystal water contained in metal salts or the like, or water adsorbed in inorganic or organic substances, with the organoaluminum compound; and (4) the method of reacting tetraalkyl dialuminoxane with trialkyl aluminum, and further reacting the reaction product with water.

The aluminoxanes may be insoluble in toluene. These aluminoxanes may be used alone or in the form of a mixture of any two or more thereof.

When using the component (B-1) as the component (B), the molar ratio of the component (A) to the component (B-1) is preferably 10:1 to 1:100 and more preferably 2:1 to 1:10. If the molar ratio of the component (A) to the component (B-1) is out of the above-specified range, the cost performance of the catalyst per unit weight of the obtained polymer is deteriorated and therefore unpractical. When using the component (B-2) as the component (B), the molar ratio of the component (A) to the component (B-2) is preferably 1:1 to 1:1,000,000 and more preferably 1:10 to 1:10,000.

If the molar ratio of the component (A) to the component (B-2) is out of the above-specified range, the cost performance of the catalyst per unit weight of the obtained polymer is deteriorated and therefore unpractical.

As the component (B), the components (B-1) and (B-2) may be used alone or in the combination thereof.

The polymerization catalyst used for producing the a-olefin polymer of the present invention may further contain an organoaluminum compound as a component (C) in addition to the components (A) and (B).

As the organoaluminum compound (C), there may be used compounds represented by the general formula (VII):

$$R^{16}_{v}AlJ_{3-v} \quad (VII)$$

wherein $R^{16}$ is $C_1$ to $C_{10}$ alkyl; J is a hydrogen atom, $C_1$ to $C_{20}$ alkoxy, $C_6$ to $C_{20}$ aryl or a halogen atom; v is an integer of 1 to 3.

Specific examples of the compounds represented by the above general formula (VII) include trimethyl aluminum, triethyl aluminum, triisopropyl aluminum, triisobutyl aluminum, dimethyl aluminum chloride, diethyl aluminum chloride, methyl aluminum dichloride, ethyl aluminum dichloride, dimethyl aluminum fluoride, diisobutyl aluminum hydride, diethyl aluminum hydride and ethyl aluminum sesquichloride.

These organoaluminum compounds may be used alone or in the combination of any two or more thereof.

The molar ratio of the catalyst component (A) to the catalyst component (C) is preferably in the range of from 1:1 to 1:10,000, more preferably from 1:5 to 1:2,000 and still more preferably from 1:10 to 1:1,000.

The use of the component (C) can enhance a polymerization activity per unit quantity of transition metal used. However, the use of a too large amount of the component (C) is uneconomical and rather tends to cause such a disadvantage that a large amount of the component (C) remains in the obtained polymer.

In the present invention, at least one of the catalyst components may be supported on a suitable carrier.

The catalyst carrier usable in the present invention is not particularly limited, and may be selected from any suitable materials such as inorganic oxides, other inorganic materials and organic materials. Of these catalyst carriers, preferred are those carriers made of inorganic oxides or other inorganic materials.

Specific examples of the inorganic oxides used as the catalyst carrier include $SiO_2$, $Al_2O_3$, MgO, $ZrO_2$, $TiO_2$, $Fe_2O_3$, $B_2O_3$, CaO, ZnO, BaO, $ThO_2$ or mixtures thereof, such as silica alumina, zeolite, ferrite and glass fibers.

Of these inorganic oxides, especially preferred are $SiO_2$ and $Al_2O_3$.

The catalyst carriers made of the inorganic oxides may contain a small amount of carbonates, nitrates, sulfates or the like.

As the other carriers, there may be used magnesium compounds represented by the general formula: $MgR^{17}_xX^1_y$, such as, typically, $MgCl_2$ and $Mg(OC_2H_5)_2$, or complex salts thereof.

In the above general formula, $R^{17}$ is $C_1$ to $C_{20}$ alkyl, $C_1$ to $C_{20}$ alkoxy or $C_6$ to $C_{20}$ aryl; $X^1$ is a halogen atom or $C_1$ to $C_{20}$ alkyl; x is a number of 0 to 2, and y is a number of 0 to 2 with the proviso that (x+y) is 2.

The respective $R^{17}$ groups or $X^1$ groups may be the same or different from each other.

Examples of the organic materials used as the catalyst carrier include polymers such as polystyrene, styrene-divinylbenzene copolymer, polyethylene, poly-1-butene, substituted polystyrene and polyarylates, starch and carbon.

Of the above-specified catalyst carriers used for producing the α-olefin polymer of the present invention, preferred are $MgCl_2$, $MgCl(OC_2H_5)$, $Mg(OC_2H_5)_2$, $SiO_2$ and $Al_2O_3$.

Although the properties of the catalyst carrier may vary depending upon kind and production method thereof, the catalyst carrier has an average particle size of usually 1 to 300 μm, preferably 10 to 200 μm and more preferably 20 to 100 μm.

The too small particle size of the catalyst carrier tends to cause increase in amount of fine powder contained in the polymer, and the too large particle size thereof tends to cause increase in amount of coarse particles contained in the polymer, resulting in reduced bulk density of the polymer or clogging of a hopper.

The catalyst carrier has a specific surface area of usually 1 to 1,000 m²/g, preferably 50 to 500 m²/g, and a pore volume of usually 0.1 to 5 m³/g, preferably 0.3 to 3 m³/g.

When the specific surface area or pore volume is out of the above-specified range, the catalyst activity tends to be deteriorated. The specific surface area and pore volume is determined, for example, from a volume of nitrogen gas absorbed according to BET method (refer to "J. Am. Chem. Soc.", 60, 309, (1983)).

Further, the carriers made of the inorganic oxides are preferably calcined at a temperature of usually 150 to 1,000° C. and preferably 200 to 800° C.

When at least one of the catalyst components is supported on the carrier, at least one of the catalyst components (A) and (B), preferably both thereof may be desirably supported thereon.

Said at least one of the catalyst components (A) and (B) may be supported on the carrier by any suitable method without particular limitations. For example, the suitable supporting methods are as follows:

(1) Method of mixing at least one of the components (A) and (B) with the carrier;

(2) Method of treating the carrier with an organoaluminum compound or a halogen-containing silicon compound, and then mixing the thus-treated carrier with at least one of the components (A) and (B) in an inert solvent;

(3) Method of reacting the carrier, the component (A) and/or the component (B), and an organoaluminum compound or a halogen-containing silicon compound with each other;

(4) Method of supporting one of the component (A) and the component (B) on the carrier, and then mixing the carrier with the other remaining component;

(5) Method of mixing a reaction product obtained by contacting the component (A) with the component (B), with the carrier; and (6) Method of contacting the component (A) with the component (B) under the co-existence of the carrier to react with each other.

In the above methods (4), (5) and (6), the organoaluminum compound as the component (C) may be added to the reaction system.

The thus-obtained catalyst may be used in the polymerization after distilling off the solvent therefrom to obtain a solid catalyst component, or may be directly applied to the polymerization.

Alternatively, in the present invention, the catalyst may be produced by supporting at least one of the component (A) and the component (B) on the carrier in the polymerization reaction system.

For example, after adding at least one of the component (A) and the component (B) together with the carrier and, if required, the organoaluminum compound as the optional component (C), olefin such as ethylene is added until reaching from ordinary pressure to 2 MPa (gauge), and pre-polymerized at a temperature of −20 to 200° C. for about 1 min to about 2 h to obtain catalyst particles.

In the catalyst used for producing the α-olefin polymer of the present invention, the mass ratio of the component (B-1) to the carrier is preferably in the range of from 1:5 to 1:10,000 and more preferably from 1:10 to 1:500, and the mass ratio of the component (B-2) to the carrier is preferably in the range of from 1:0.5 to 1:1000 and more preferably from 1:1 to 1:50.

When the component (B) is in the form of a mixture of any two or more thereof, the mass ratio of each of the components (B) to the carrier preferably lies within the above-specified range.

Also, the mass ratio of the component (A) to the carrier is preferably in the range of from 1:5 to 1:10,000 and more preferably from 1:10 to 1:500.

If the mass ratio of the component (B), i.e., the component (B-1) or the component (B-2), to the carrier, or the mass ratio of the component (A) to the carrier is out of the above-specified range, the catalytic activity of the obtained catalyst tends to be deteriorated.

The thus-prepared polymerization catalyst of the present invention has an average particle size of usually 2 to 200 μm, preferably 10 to 150 μm and more preferably 20 to 100 μm; and a specific surface area of usually 20 to 1,000 m$^2$/g and preferably 50 to 500 m$^2$/g.

If the average particle size of the catalyst is less than 2 μm, the amount of fine powder contained in the obtained polymer tends to be increased. If the average particle size of the catalyst exceeds 200 μm, the amount of coarse particles contained in the obtained polymer tends to be increased.

If the specific surface area of the catalyst is less than 20 m$^2$/g, the catalytic activity thereof tends to be deteriorated. If the specific surface area of the catalyst exceeds 1,000 m$^2$/g, the obtained polymer tends to be lowered in bulk density.

Also, in the catalyst for production of 1-butene-based polymers, the amount of the transition metal contained therein is usually 0.05 to 10 g and preferably 0.1 to 2 g per 100 g of the carrier.

If the amount of the transition metal contained in the catalyst is out of the above-specified range, the catalytic activity thereof tends to be deteriorated.

The use of such a supported catalyst enables production of polymers having an industrially useful high bulk density and an excellent particle size distribution.

The polymerization methods used for production of the α-olefin polymer of the present invention are not particularly limited, and examples of the polymerization methods include slurry polymerization, vapor-phase polymerization, bulk polymerization, solution polymerization and suspension polymerization. Of these methods, preferred are slurry polymerization and vapor-phase polymerization.

As to the polymerization conditions, the polymerization temperature is usually from −100 to 250° C., preferably from −50 to 200° C. and more preferably from 0 to 130° C.

Also, the amounts of the reactants and the catalyst used may be controlled such that the molar ratio of the raw monomers to the above component (A) is preferably in the range of 1 to $10^8$ and more preferably 100 to $10^5$.

Further, the polymerization time is usually from 5 min to 10 h, and the polymerization reaction pressure is preferably from ordinary pressure to 20 MPa (gauge) and more preferably from ordinary pressure to 10 MPa (gauge).

In the process for production of the α-olefin polymer according to the present invention, hydrogen is preferably added to the reaction system to improve the polymerization activity.

The hydrogen is added at a pressure of usually from ordinary pressure to 5 MPa (gauge), preferably from ordinary pressure to 3 MPa (gauge) and more preferably from ordinary pressure to 2 MPa (gauge).

The polymerization reaction may be conducted in the presence of a solvent. Examples of the solvent include aromatic hydrocarbons such as benzene, toluene, xylene and ethyl benzene; alicyclic hydrocarbons such as cyclopentane, cyclohexane and methyl cyclohexane; aliphatic hydrocarbons such as pentane, hexane, heptane and octane; and halogenated hydrocarbons such as chloroform and dichloromethane.

These solvent may be used alone or in the combination of any two or more thereof.

Also, the monomers such as α-olefins may be used as the solvent.

Meanwhile, the polymerization may also be performed in the absence of a solvent.

Prior to the substantial polymerization, a preliminary polymerization may be conducted using the above polymerization catalyst.

The preliminary polymerization may be conducted, for example, by contacting the solid catalyst component with a small amount of olefins. The contact method is not particularly limited, and may be any known method.

Also, the olefins usable in the preliminary polymerization are not particularly limited, and there may be used the same olefins as described above, e.g., ethylene, $C_3$ to $C_{20}$ α-olefins or mixtures thereof. The olefins used in the preliminary polymerization are preferably identical to those used in the subsequent substantial polymerization.

The preliminary polymerization temperature is usually from −20 to 200° C., preferably from −10 to 130° C. and more preferably from 0 to 80° C.

The preliminary polymerization may be conducted in the presence of any suitable solvent such as aliphatic hydrocarbons, aromatic hydrocarbons and other monomers.

Of these solvents, preferred are aliphatic hydrocarbons.

Also, the preliminary polymerization may be conducted in the absence of a solvent.

The preliminary polymerization conditions may be suitably controlled such that the obtained preliminary polymerization product has an intrinsic viscosity [η] of 0.1 dL/g or higher as measured at 135° C. in decalin, and the yield thereof is 1 to 10,000 g and preferably 10 to 1,000 g per one millimole of the transition metal contained in the catalyst.

The molecular weight of the polymer may be controlled by appropriately selecting kinds and amounts of the respective catalyst components and polymerization temperature, and further by conducting the polymerization in the presence of hydrogen.

Further, the polymerization may be conducted in the presence of an inert gas such as nitrogen.

As described above, according to the process of the present invention, it is possible to efficiently produce a crystalline higher α-olefin polymer that is excellent in low-temperature characteristics, rigidity, heat resistance, compatibility with lubricating oils, mixability with inorganic fillers, and fabricability (secondary processability).

The present invention will be described in more detail by reference to the following examples. However, it should be noted that the following examples are only illustrative and not intended to limit the invention thereto.

First, evaluation methods for properties of the α-olefin polymers obtained according to the present invention are explained.

(1) Stereoregularity Index M2

Measured by the method described in the present specification.

(2) Weight-Average Molecular Weight (Mw) and Molecular Weight Distribution (Mw/Mn)

Measured by the methods described in the present specification.

(3) DSC Measurement

Using a differential scanning calorimeter "DSC-7" available from Perkin Elmer Corp., 10 mg of a sample was held in a nitrogen atmosphere at −10° C. for 5 min, and then heated to 190° C. at a temperature rise rate of 10° C./min to prepare a melting endotherm (ΔHD) curve thereof. The melting point (TmD) was defined as a top of a peak observed in the thus prepared melting endothermic curve. The sample was further held at 190° C. for 5 min, cooled to −10° C. at a temperature drop rate of 5° C./min, held at −10° C. for 5 min, and then heated again to 190° C. at a temperature rise rate of 10° C./min to prepare a melting endotherm (ΔH) curve thereof. The melting point (Tm) was defined as a top of a peak observed in the thus prepared melting endothermic curve.

(4) Crystallinity

In the above DSC measurement, when the melting point (TmD) was detected, the crystallinity was evaluated as Rating A; and when no melting point (TmD) was detected, the crystallinity was evaluated as Rating B.

PRODUCTION EXAMPLE 1

Production of 2-chlorodimethylsilyl indene

An one-liter three-necked flask was charged with 50 mL of THF (tetrahydrofuran) and 2.5 g (41 mM) of magnesium and then with 0.1 mL of 1,2-dibromoethane under a nitrogen flow, and the resultant mixture was stirred for 30 min to activate the magnesium.

After completion of the stirring, the solvent was removed from the mixture, and 50 mL of fresh THF was added thereto.

Then, a solution prepared by dissolving 5.0 g (25.6 mM) of 2-bromoindene in 200 mL of THF was dropped into the reaction mixture over 2 h.

After completion of the dropping, the reaction mixture was stirred at room temperature for 2 h and cooled to −78° C. Then, a solution prepared by dissolving 3.1 mL (25.6 mM) of dichlorodimethylsilane in 100 mL of THF was dropped to the reaction mixture over 1 h. The resultant reaction solution was stirred for 15 h, and then distilled to remove the solvent therefrom.

The obtained residue was extracted with 200 mL of hexane. Then, the solvent was distilled away from the extract to obtain 6.6 g (24.2 mM) of 2-chlorodimethylsilyl indene (yield: 94%).

PRODUCTION EXAMPLE 2

Production of (1,2'-dimethylsilylene) (2,1'-dimethylsilylene)-bis(indene)

An one-liter three-necked flask was charged with 400 mL of THF and 8 g of 2-chlorodimethylsilyl indene obtained in PRODUCTION EXAMPLE 1 under a nitrogen flow, and the resultant solution was cooled to −78° C. To the thus obtained solution was dropped 38.5 mL (38.5 mM) of a THF solution of LiN(SiMe$_3$)$_2$ (1.0 mol/L).

The obtained reaction solution was stirred at room temperature for 15 h, and then distilled to remove the solvent therefrom, and further extracted with 300 mL of hexane. The solvent was distilled away from the resultant extract to obtain 2.0 g (6.4 mM) of (1,2'-dimethylsilylene) (2,1'-dimethylsilylene)-bis(indene)(yield: 33.4%).

PRODUCTION EXAMPLE 3

Production of (1,2'-dimethylsilylene) (2,1'-dimethylsilylene)(indenyl)(3-trimethylsilylmethylindenyl) zirconium dichloride A 200 mL Schlenk's bottle was charged with 50 mL of ether and 3.5 g (10.2 mM) of (1,2'-dimethylsilylene)(2,1'-dimethylsilylene)-bis(indene) obtained in PRODUCTION EXAMPLE 2 under a nitrogen flow.

After the content of the bottle was cooled to −78° C., 12.8 mL of a hexane solution containing 1.60 M of n-butyl lithium (n-BuLi) was dropped thereto.

The resultant reaction mixture was stirred at room temperature for 8 h, and then the solvent was distilled away therefrom. The obtained solid was dried under reduced pressure to obtain 5.0 g of a white solid.

The white solid was dissolved in 50 mL of THF, and then 1.4 mL of iodomethyltrimethylsilane was dropped to the obtained solution at room temperature.

The resultant reaction solution was mixed with 10 mL of water, and an organic phase thereof was extracted with 50 mL of ether. The obtained organic phase was then dried to distill off the solvent therefrom.

After adding 50 mL of ether to the obtained residue, 12.4 mL of a hexane solution containing 1.60 M of n-BuLi was dropped thereto at −78° C.

The resultant reaction solution was heated to room temperature and stirred for 3 h to distill off the ether therefrom.

The obtained solid was washed with 30 mL of hexane and then dried under reduced pressure to obtain 5.11 g of a white solid.

The thus obtained white solid was suspended in 50 mL of toluene, and then mixed with a slurry separately prepared by suspending 2.0 g (8.6 mM) of zirconium tetrachloride in 10 mL of toluene in a Schlenk's bottle.

The obtained suspension was stirred at room temperature for 12 h, and the solvent was distilled away therefrom. Then, the obtained residue was washed with 50 mL of hexane.

The residue was recrystallized from 30 mL of dichloromethane to obtain 1.2 g of (1,2'-dimethylsilylene)(2,1'-dimethylsilylene)(indenyl) (3-trimethylsilylmethylindenyl) zirconium dichloride in the form of yellow fine crystals (yield: 25%).

$^1$H-NMR (90 MHz, CDCl$_3$):δ-0.09 (s, —SiMe$_3$, 9H); 0.89, 0.86, 1.03, 1.06 (s, —Me$_2$Si—, 12H); 2.20, 2.65 (d, —CH$_2$—, 2H); 6.99 (s, CH, $^1$H); 7.0–7.8 (m, ArH, 8H)

EXAMPLE 1

An one liter autoclave previously heat-dried was charged with 200 mL of heptane, 200 mL of 1-octadecene (C$_{18}$), 0.5 mM of triisobutyl aluminum and 1 mM of methyl aluminoxane, and then hydrogen was introduced into the autoclave until reaching 0.03 MPa.

After heating the contents of the autoclave to 60° C. while stirring, 1 μM of (1,2'-dimethylsilylene)(2,1'-dimethylsilylene) (3-trimethylsilylmethylindenyl)(indenyl) zirconium dichloride obtained in PRODUCTION EXAMPLE 3 was added thereto, and the polymerization was conducted for 30 min.

After completion of the polymerization reaction, the resultant reaction product was heat-dried under reduced pressure to obtain 25 g of a higher α-olefin polymer.

The results of measurement of physical properties of the thus obtained polymer are shown in Table 1.

EXAMPLE 2

An one liter autoclave previously heat-dried was charged with 200 mL of 1-octadecene (C$_{18}$) and 10 mM of methyl aluminoxane, and then hydrogen was introduced into the autoclave until reaching 0.2 MPa.

After heating the contents of the autoclave to 60° C. while stirring, 10 μM of (1,2'-dimethylsilylene)(2,1'-dimethylsilylene) (3-trimethylsilylmethylindenyl)(indenyl) zirconium dichloride obtained in PRODUCTION EXAMPLE 3 was added thereto, and the polymerization was conducted for 30 min.

After completion of the polymerization reaction, the resultant reaction product was heat-dried under reduced pressure to obtain 10 g of a higher α-olefin polymer.

The results of measurement of physical properties of the thus obtained polymer are shown in Table 1.

EXAMPLE 3

An one liter autoclave previously heat-dried was charged with 200 mL of 1-hexadecene (C$_{16}$) and 10 mM of methyl aluminoxane, and then hydrogen was introduced into the autoclave until reaching 0.2 MPa.

After heating the contents of the autoclave to 60° C. while stirring, 10 μM of (1,2'-dimethylsilylene)(2,1'-dimethylsilylene) (3-trimethylsilylmethylindenyl)(indenyl) zirconium dichloride obtained in PRODUCTION EXAMPLE 3 was added thereto, and the polymerization was conducted for 30 min.

After completion of the polymerization reaction, the resultant reaction product was heat-dried under reduced pressure to obtain 16 g of a higher α-olefin polymer.

The results of measurement of physical properties of the thus obtained polymer are shown in Table 1.

PRODUCTION EXAMPLE 4

Production of ethyl(2-indenyl)acetate

Under a nitrogen flow, 3.3 g (0.14 M) of sodium hydride was suspended in 300 mL of tetrahydrofuran, and the resultant suspension was cooled to 10° C.

Then, 200 mL of a tetrahydrofuran solution containing 28.3 g (0.11 M) of ethyldiethylphosphonoacetate was dropped to the thus obtained suspension over 1 h.

After completion of the dropping, the resultant reaction mixture was stirred at room temperature for 30 min and cooled with ice, and then 75 mL of a tetrahydrofuran solution containing 16.33 g (0.12 M) of 2-indanone was dropped to the reaction mixture over 1 h.

After completion of the dropping, the resultant reaction mixture was stirred at room temperature for 30 min, hydrolyzed with water, and then extracted with 500 mL of diethyl ether. An organic phase was separated from the obtained extract, and the solvent was distilled away therefrom.

The resultant residue was distilled under reduced pressure to isolate 11.06 g of ethyl(2-indenyl)acetate as a light-yellow oil therefrom (yield: 49.5%).

The results of the $^1$H-NMR measurement of the resultant product were as follows:
$^1$H-NMR (CDCl$_3$):(δ, ppm): 1.23 (t, 3H), 3.40 (s, 2H), 3.45 (s, 2H), 4.16 (q, 2H), 6.65 (s, 1H), 6.94–7.50 (m, 4H)

PRODUCTION EXAMPLE 5

Production of 2-(2-indenyl)-ethanol

Under a nitrogen flow, 2.2 g (58.49 mM) of lithium aluminum hydride was suspended in 100 mL of diethyl ether.

Then, 50 mL of a diethyl ether solution containing 11.06 g (59.06 mM) of ethyl(2-indenyl)acetate obtained in PRODUCTION EXAMPLE 4 was dropped to the thus obtained suspension over 1 h.

After completion of the dropping, the resultant mixture was stirred at room temperature for 30 min and cooled with ice. Then, 50 mL of water was gradually added to the mixture, and further dilute hydrochloric acid was added thereto to dissolve insoluble substances therein.

An organic phase was separated from the obtained solution, and the solvent was distilled away under reduced pressure therefrom to obtain 2-(2-indenyl)-ethanol as a white solid.

As a result, it was confirmed that the amount of 2-(2-indenyl)-ethanol produced was 7.89 g.

The thus obtained reaction product was directly used in the subsequent reaction without no further purification treatment thereof.

The results of the $^1$H-NMR measurement of the resultant product were as follows:
$^1$H-NMR (CDCl$_3$):(δ, ppm): 1.56 (s, 1H), 2.76 (t, 2H), 3.37 (s, 2H), 3.83 (t, 2H), 6.62 (s, 1H), 6.95–7.62 (m, 4H)

PRODUCTION EXAMPLE 6

Production of 1-bromo-2-(2-indenyl)ethane

Under a nitrogen flow, 4.61 g (28.77 mM) of 2-(2-indenyl)-ethanol obtained in PRODUCTION EXAMPLE 5 was dissolved in 65 mL of dichloromethane.

After adding 7.66 g (29.20 mM) of triphenyl phosphine to the thus obtained solution, 5.19 g (29.16 mM) of N-bromosuccinimide was gradually added thereto.

After completion of the addition of N-bromosuccinimide, the resultant mixture was stirred at room temperature for 30 min. Thereafter, the mixture was mixed with water, and an organic phase was separated therefrom and then dried with anhydrous magnesium sulfate.

The solvent was distilled away from the organic phase under reduced pressure, and the resultant residue was purified by a silica gel column (developing solvent: hexane) to obtain 1-bromo-2-(2-indenyl)ethane as a colorless oily substance.

As a result, it was confirmed that 5.07 g of 1-bromo-2-(2-indenyl)ethane was obtained (yield: 80.85%).

The results of the $^1$H-NMR measurement of the resultant product were as follows:

$^1$H-NMR (CDCl$_3$):(δ, ppm): 3.02 (t, 2H), 3.32 (s, 2H), 3.52 (t, 2H), 6.60 (s, 1H), 6.93–7.53 (m, 4H)

PRODUCTION EXAMPLE 7

Production of (1,2'-ethylene) (2,1'-ethylene)-bis (indene)

Under a nitrogen flow, 6.87 mL (52.41 mM) of diisopropyl amine was added in 50 mL of tetrahydrofuran, and the resultant solution was cooled to −78° C.

Then, 31.96 mL of a 1.64 M/L hexane solution of n-butyl lithium (n-butyl lithium: 52.41 mM) was dropped to the thus obtained solution for 10 min.

After completion of the dropping, the temperature of the resultant reaction mixture was naturally raised to 0° C. to prepare a solution of LDA (lithium diisopropyl amide).

Next, under a nitrogen flow, 11.69 g (52.39 mM) of 1-bromo-2-(2-indenyl)ethane obtained in PRODUCTION EXAMPLE 6 was added to 500 mL of tetrahydrofuran and dissolved therein under stirring, and then the obtained solution was cooled to −78° C.

Then, the previously prepared LDA solution cooled to −78° C. was dropped to the thus obtained solution over 30 min.

After completion of dropping the LDA solution, the temperature of the resultant solution was naturally raised to room temperature and then stirred for 12 h.

The obtained reaction mixture was mixed with 500 mL of water to wash an organic phase thereof, and then mixed with anhydrous magnesium sulfate to dry the organic phase.

After separating magnesium sulfate from the reaction mixture, the solvent was distilled away therefrom under reduced pressure to obtain 5.95 g of a crude product of (1,2'-ethylene)(2,1'-ethylene)-bis(indene) as a white solid.

As a result of analyzing the thus obtained crude product by FD-MS (field desorption mass spectrum) method, it was confirmed that the crude product was (1,2'-ethylene)(2,1'-ethylene)-bis(indene)(dimer) as an aimed product.

The crude product was subjected to sublimation purification at 150° C. under a pressure of 0.2 torr (0.027 kPa) to obtain 1.87 g of (1,2'-ethylene) (2,1'-ethylene)-bis(indene) (yield: 25.1%).

The structure of the resultant product was confirmed by FD-MS and $^1$H-NMR.

Meanwhile, the FD-MS measurement was conducted at an acceleration voltage of 8 kV.

$^1$H-NMR (CDCl$_3$):(δ, ppm): 3.02 (s, 8H), 3.29 (s, 4H), 7.0–7.5 (m, 8H) FD-MS: M$^+$=284

PRODUCTION EXAMPLE 8

Production of dilithium salt of (1,2'-ethylene) (2,1'-ethylene)-bis(indene)

Under a nitrogen flow, 1.87 g (6.58 mM) of (1,2'-ethylene) (2,1'-ethylene)-bis(indene) obtained in PRODUCTION EXAMPLE 7 was mixed with 100 mL of diethyl ether, and the resultant mixture was stirred and then cooled to −78° C.

Then, 8.02 mL of a 1.64 M/L hexane solution of n-butyl lithium (n-butyl lithium: 13.15 mM) was dropped to the reaction mixture for 30 min.

The temperature of the resultant reaction mixture was naturally raised to room temperature, and then the mixture was stirred at room temperature for 12 h. Then, the reaction mixture was treated under reduced pressure to distill off the solvent therefrom. The obtained residue was washed with 50 mL of hexane two times.

Then, the residue was dried under reduced pressure to obtain a dilithium salt of (1,2'-ethylene)(2,1'-ethylene)-bis (indene) as light-yellow particles.

The results of $^1$H-NMR measurement of the reaction product are as follows.

Meanwhile, THF means tetrahydrofuran.

The thus obtained product was in the form of a diethyl ether adduct, and was directly used in the subsequent reaction.

It was confirmed that 1.63 g of the dilithium salt of (1,2'-ethylene) (2,1'-ethylene)-bis(indene) was obtained (yield: 69.3%).

$^1$H-NMR THF-d$_8$):(δ, ppm): 3.22 (8H), 5.38 (s, 2H), 5.95–6.35 (m, 4H), 6.70–7.20 (m, 4H)

PRODUCTION EXAMPLE 9

Production of (1,2'-ethylene) (2,1'-ethylene)-bis (indenyl) zirconium dichloride Under a nitrogen flow, 1.63 g (4.56 mM) of the dilithium salt of (1,2'-ethylene)(2,1'-ethylene)-bis(indene) obtained in PRODUCTION EXAMPLE 8 was suspended in 50 mL of toluene, and the resultant suspension was cooled to −78° C.

Separately, under a nitrogen flow, 1.06 g (4.56 mM) of zirconium tetrachloride was suspended in 100 mL of toluene, and the resultant suspension was cooled to −78° C.

The previously obtained toluene suspension of the dilithium salt of (1,2'-ethylene)(2,1'-ethylene)-bis(indene) was dropped to the thus obtained toluene suspension of zirconium tetrachloride over 30 min.

The temperature of the resultant reaction mixture was naturally raised to room temperature, and then the mixture was stirred at room temperature for 12 h. After a toluene supernatant was separated from the reaction mixture by filtration, the resultant residue was extracted with 50 mL of dichloromethane two times.

The solvent was distilled away under reduced pressure, and the resultant residue was recrystallized with dichloromethane/hexane to obtain 0.25 g of (1,2'-ethylene)(2,1'-ethylene)-bis(indenyl) zirconium dichloride.

It was confirmed that the yield of the reaction product was 12.3%.

The results of $^1$H-NMR measurement of the reaction product are as follows.

$^1$H-NMR (CDCl$_3$):(δ, ppm): 3.62 (8H), 6.53 (s, 2H), 6.90–7.60 (m, 8H)

The structure of the transition metal compound is shown below.

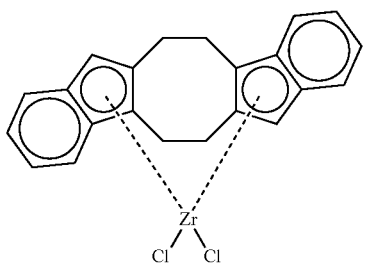

EXAMPLE 4

An one liter autoclave previously heat-dried was charged with 200 mL of 1-dodecene ($C_{12}$) and 5 mM of methyl aluminoxane, and then hydrogen was introduced into the autoclave until reaching 0.5 MPa.

After heating the contents of the autoclave to 60° C. while stirring, 5 μM of (1,2'-ethylene)(2,1'-ethylene)-bis(indenyl) zirconium dichloride obtained in PRODUCTION EXAMPLE 9 was added thereto, and the polymerization was conducted for 30 min.

After completion of the polymerization reaction, the resultant reaction product was heat-dried under reduced pressure to obtain 14 g of a higher α-olefin polymer.

The results of measurement of physical properties of the thus obtained polymer are shown in Table 1.

COMPARATIVE EXAMPLE 1

An one liter autoclave previously heat-dried was charged with 200 mL of heptane, 200 mL of 1-octene ($C_8$), 0.5 mM of triisobutyl aluminum and 1 mM of methyl aluminoxane, and then hydrogen was introduced into the autoclave until reaching 0.03 MPa.

After heating the contents of the autoclave to 60° C. while stirring, 1 μM of (1,2'-dimethylsilylene) (2,1'-dimethylsilylene)(3-trimethylsilylmethylindenyl)(indenyl) zirconium dichloride obtained in PRODUCTION EXAMPLE 3 was added thereto, and the polymerization was conducted for 30 min.

After completion of the polymerization reaction, the resultant reaction product was heat-dried under reduced pressure to obtain 68 g of a higher α-olefin polymer.

The results of measurement of physical properties of the thus obtained polymer are shown in Table 1.

The melting points of the polymers obtained in the above EXAMPLES 1 to 4 were fallen within the range of 28.2 to 41.8° C., and no stickiness occurred at a temperature not higher than the melting points.

On the other hand, the polymer obtained in COMPARATIVE EXAMPLE 1 exhibited stickiness at room temperature (about 25° C.).

Thus, the polymers obtained according to the present invention 15 exhibited stickiness only at a high temperature and, therefore, could be readily pelletized. Further, since the thus obtained pellets could be preserved at room temperature, the polymers of the present invention were excellent in handling property.

PRODUCTION EXAMPLE 10

Production of (1,2'-dimethylsilylene) (2,1'-dimethylsilylene)-bis(3-trimethylsilylmethylindenyl) zirconium dichloride A 200 mL Schlenk's bottle was charged with 2.5 g (7.2 mM) of (1,2'-dimethylsilylene)(2,1'-dimethylsilylene)-bis(indene) and 100 ml of ether under a nitrogen flow.

After the contents of the bottle were cooled to −78° C., 9.0 mL of a 1.6M hexane solution of n-butyl lithium (n-BuLi: 14.8 mM) was added thereto, and the resultant mixture was stirred at room temperature for 12 h.

The reaction mixture was distilled to remove the solvent therefrom and obtain a solid. The obtained solid was washed with 20 mL of hexane and then dried under reduced pressure to quantitatively obtain a lithium salt as a white solid.

In a Schlenk's bottle, 6.97 mM of the thus obtained lithium salt of (1,2'-dimethylsilylene)(2,1'-dimethylsilylene)-bis(indene) was dissolved in 50 mL of THF. Then, 2.1 mL (14.2 mM) of iodomethyltrimethylsilane was slowly dropped to the thus obtained solution at room temperature, and the mixture was stirred for 12 h.

The obtained reaction solution was distilled to remove the solvent therefrom. The resultant residue was mixed with 50 mL of ether, and then washed with a saturated ammonium chloride solution.

An organic phase was separated from the reaction solution, and then dried to remove the solvent therefrom, thereby obtaining 3.04 g (5.9 mM) of (1,2'-dimethylsilylene)(2,1'-dimethylsilylene) bis(3-trimethylsilylmethylindene)(yield: 84%).

TABLE 1

| | Examples | | | | Com. Ex. 1 |
|---|---|---|---|---|---|
| | 1 | 2 | 3 | 4 | |
| Raw olefin | $C_{18}$ | $C_{18}$ | $C_{16}$ | $C_{12}$ | $C_8$ |
| Weight-average molecular weight (Mw) | $1.5 \times 10^5$ | $5.3 \times 10^4$ | $7.0 \times 10^4$ | $1.8 \times 10^4$ | $1.6 \times 10^5$ |
| Molecular weight distribution (Mw/Mn) | 1.80 | 4.66 | 2.47 | 1.82 | 1.80 |
| Melting point (TmD) (° C.) | 42.6 | 45.5 | 36.5 | 37.4 | None |
| Melting endotherm (ΔHD) (J/g) | 82.8 | 96.9 | 77.5 | 72.2 | — |
| Melting point (Tm) (° C.) | 41.1 | 41.1 | 28.2 | 41.8 | None |
| Melting endotherm (ΔH) (J/g) | 79.1 | 85.7 | 71.1 | 62.9 | — |
| Stereoregularity index $M_2$ (mol %) | 68.2 | 63.8 | 66.2 | 89.2 | 79.8 |
| Crystallinity | A | A | A | A | B |

Next, 3.04 g (5.9 mM) of (1,2'-dimethylsilylene)(2,1'-dimethylsilylene) bis(3-trimethylsilylmethylindene) obtained above and 50 mL of ether were charged into a Schlenk's bottle under a nitrogen flow.

After the contents of the bottle were cooled to −78° C., 7.4 mL of a 1.6M hexane solution of n-butyl lithium (n-BuLi: 11.8 mM) was added thereto, and the resultant mixture was stirred at room temperature for 12 h.

The reaction mixture was distilled to remove the solvent therefrom and obtain a solid. The obtained solid was washed with 40 mL of hexane to obtain 3.06 g of a lithium salt as an ether adduct.

The results of $^1$H-NMR measurement of the obtained product were as follows:

$^1$H-NMR (90 MHz, THF-d$_8$):δ 0.04 (s, —SiMe$_3$, 18H); 0.48 (s, —Me$_2$Si—, 12H); 1.10 (t, —CH$_3$, 6H), 2.59 (s, —CH$_2$—, 4H), 3.38 (q, —CH$_2$—, 4H); 6.2–7.7 (m, Ar—H, 8H)

Then, 3.06 g of the lithium salt obtained above was suspended in 50 mL of toluene under a nitrogen flow.

After cooling the obtained suspension to −78° C., a suspension prepared by dispersing 1.2 g (5.1 mM) of zirconium tetrachloride in 20 mL of toluene which was previously cooled to −78° C., was dropped thereto.

After completion of the dropping, the resultant mixture was stirred at room temperature for 6 h.

The obtained reaction solution was distilled to remove the solvent therefrom. Thereafter, the resultant residue was recrystallized with dichloromethane to obtain 0.9 g (1.33 mM) of (1,2'-dimethylsilylene) (2,1'-dimethylsilylene) bis(3-trimethylsilylmethylindenyl) zirconium dichloride as yellow fine crystals (yield: 26%).

The results of $^1$H-NMR measurement of the obtained product were as follows:

$^1$H-NMR (90 MHz, CDCl$_3$):δ 0.0 (s, —SiMe$_3$, 18H); 1.02, 1.12 (s, —Me$_2$Si—, 12H); 2.51 (dd, —CH$_2$—, 4H), 7.1–7.6 (m, Ar—H, 8H)

EXAMPLE 5

An one liter autoclave previously heat-dried was charged with 200 mL of 1-octadecene (C$_{18}$), 1 mM of triisobutyl aluminum, and 1 mM of methyl aluminoxane and 1 μM of (1,2'-dimethylsilylene)(2,1'-dimethylsilylene) bis(3-trimethylsilylmethylindenyl) zirconium dichloride which were both obtained in PRODUCTION EXAMPLE 10. Then, hydrogen was introduced into the autoclave until reaching 0.03 MPa, and the polymerization was conducted at 30° C. for 60 min.

After completion of the polymerization reaction, the reaction product was precipitated with acetone, and then heat-dried under reduced pressure to obtain 59 g of a higher α-olefin polymer.

The results of measurement of physical properties of the thus obtained polymer are shown in Tables 2 and 3.

EXAMPLE 6

An one liter autoclave previously heat-dried was charged with 200 mL of heptane, 200 mL of 1-octadecene (C$_{18}$), 1.0 mM of triisobutyl aluminum and 1.0 mM of methyl aluminoxane, and then hydrogen was introduced into the autoclave until reaching 0.03 MPa.

After heating the contents of the autoclave to 60° C. while stirring, 1.0 μM of (1,2'-dimethylsilylene)(2,1'-dimethylsilylene) bis(3-trimethylsilylmethylindenyl) zirconium dichloride obtained in PRODUCTION EXAMPLE 10 was added thereto, and the polymerization was conducted for 60 min.

After completion of the polymerization reaction, a re-precipitation procedure using acetone was repeated to precipitate the reaction product, and the precipitated reaction product was heat-dried under reduced pressure to obtain 50.7 g of a higher α-olefin polymer.

The results of measurement of physical properties of the thus obtained polymer are shown in Tables 2 and 3.

PRODUCTION EXAMPLE 11

Production of Solid Catalyst Component
(Precipitation of Solid Catalyst Component)

A 0.5 L three-necked flask equipped with a stirrer was purged with a nitrogen gas, and then charged with 80 mL of dehydrated heptane and 4.0 g (35 mM) of diethoxymagnesium.

After heating the contents of the flask to 80° C., 13.2 mM of n-dibutyl phthalate was added thereto.

While holding the temperature of the obtained solution at 80° C., 116 mL (1.06 M) of titanium tetrachloride was successively added thereto, and the resultant mixture was stirred at an inside temperature of 110° C. for 2 h to conduct a catalyst supporting treatment.

Thereafter, the resultant supported catalyst was fully washed with dehydrated heptane. Further, 116 mL (1.06 mM) of titanium tetrachloride was added to the supported catalyst, and the resultant mixture was stirred at an inside temperature of 110° C. for 2 h to conduct a second catalyst supporting treatment.

Thereafter, the resultant supported catalyst was fully washed with dehydrated heptane to obtain a solid catalyst component (amount of titanium supported: 1.21% by weight).

COMPARATIVE EXAMPLE 2

An one liter autoclave previously heat-dried was charged with 200 mL of heptane, 200 mL of 1-octadecene (C$_{18}$), 0.8 mM of triisobutyl aluminum and 0.04 mM of dicyclopentyldimethoxysilane, and then hydrogen was introduced into the autoclave until reaching 0.05 MPa.

After heating the contents of the autoclave to 60° C. while stirring, the solid catalyst component obtained in PRODUCTION EXAMPLE 11 was added in an amount of 0.8 μM in terms of Ti atom thereto, and the polymerization was conducted for 60 min.

After completion of the polymerization reaction, a re-precipitation procedure using acetone was repeated to precipitate the reaction product, and the precipitated reaction product was heat-dried under reduced pressure to obtain 30.0 g of a higher α-olefin polymer.

The results of measurement of physical properties of the thus obtained polymer are shown in Tables 2 and 3.

COMPARATIVE EXAMPLE 3

A 10 L autoclave previously heat-dried was charged with 4000 mL of heptane, 4000 mL of 1-octadecene (C$_{18}$), 24.0 mM of triisobutyl aluminum and 1.2 mM of dicyclopentyldimethoxysilane, and then hydrogen was introduced into the autoclave until reaching 0.8 MPa.

After heating the contents of the autoclave to 80° C. while stirring, the solid catalyst component obtained in PRODUC- TION EXAMPLE 11 was added in an amount of 160 μM in terms of Ti atom thereto, and the polymerization was conducted for 120 min.

After completion of the polymerization reaction, a reprecipitation procedure using acetone was repeated to precipitate the reaction product, and the precipitated reaction product was heat-dried under reduced pressure to obtain 760.0 g of a higher α-olefin polymer.

The results of measurement of physical properties of the thus obtained polymer are shown in Tables 2 and 3.

TABLE 2

|  | Examples | | Comparative Examples | |
|---|---|---|---|---|
|  | 5 | 6 | 2 | 3 |
| Mw (in terms of PS) | 360000 | 130000 | 2550000 | 290000 |
| Mw/Mn | 1.9 | 1.8 | 3.8 | 4.4 |
| TmD (° C.) | 44.7 | 46.2 | 38.6 | 37.4 |
|  |  |  | 71.2 | 70.8 |
| ΔHD (J/g) | 80.5 | 88.2 | 110.5 | 111.9 |
| Tm (° C.) | 41.3 | 41.2 | 26.0 | 26.2 |
|  |  |  | 72.5 | 67.1 |
| ΔH (J/g) | 81.6 | 78.2 | 113.2 | 106.0 |
| M2 (mol %) | 60.2 | 67.3 | 93.0 | 94.1 |

TABLE 3

|  |  | Examples | | Comparative Examples | |
|---|---|---|---|---|---|
|  | ° C. | 5 | 6 | 2 | 3 |
| T₁ (ms) at respective temperatures | -5 | 163 |  |  | 287 |
|  | 0 |  |  |  | 285 |
|  | 5 | 173 |  |  | 277 |
|  | 10 |  |  |  | 275 |
|  | 15 | 173 |  |  | 256 |
|  | 20 | 178 |  |  | 245 |
|  | 25 | 182 |  |  | 241 |
|  | 30 | 194 | 193 | 226 | 240 |
|  | 35 | 195 | 193 | 217 | 222 |
|  | 40 | 123 | 127 | 223 | 220 |
|  | 45 | 84 | 84 | 226 | 214 |
|  | 50 | 88 | 87 | 226 | 222 |
|  | 55 |  |  |  | 220 |
|  | 60 | 99 | 100 | 242 | 214 |
|  | 65 |  |  | 92 317 | 208 |
|  | 70 |  |  | 104 362 | 78 252 |
|  | 75 |  |  | 105 372 | 87 300 |
|  | 80 |  |  | 119 420 | 91 350 |
|  | 85 |  |  | 123 463 |  |
| Stickiness: room temperature |  | A | A | B | B |

A: no sticky
B: sticky

From Tables 2 and 3, it was confirmed that the polymers obtained in EXAMPLES 5 and 6 exhibited a single melting point (Tm) and a single relaxed time (T₁) even at a temperature not lower than the melting point, and had no stickiness, whereas the polymers obtained in COMPARATIVE EXAMPLES 2 and 3 exhibited two melting points (Tm) as well as two relaxation time (T1) near the melting point and at a temperature not lower than the melting point which were apparently different from each other, and had stickiness.

INDUSTRIAL APPLICABILITY

According to the process of the present invention, it is possible to efficiently produce a crystalline higher α-olefin polymer that is excellent in low-temperature characteristics, rigidity, heat resistance, compatibility with lubricating oils, mixability with inorganic fillers, and fabricability (secondary processability) which is, therefore, useful as resin modifiers, components of lubricating oils, tackifiers and adhesives, heat accumulators, modifiers for fuel oils, modifiers for asphalt, high-performance waxes, and organic and inorganic composite materials.

What is claimed is:

1. A crystalline higher α-olefin polymer, comprising:
   in polymerized form, units of at least one higher α-olefin having 10 or more carbon atoms,
   wherein a melting endothermic curve of said crystalline higher α-olefin polymer obtained by a differential scanning calorimeter (DSC) exhibits a single peak melting point which is labeled depending on the measurement conditions as TmD and Tm,
   wherein TmD is defined as a top of said single peak observed in said melting endothermic curve obtained by said DSC when a sample is held in a nitrogen atmosphere at −10° C. for 5 min and then heated to 190° C. at a temperature rise rate of 10° C./min, and
   wherein Tm is between 20 to 100° C. and is defined as a top of said single peak observed in said melting endothermic curve obtained when the sample is further held at 190° C. for 5 min, cooled to −10° C. at a temperature drop rate of 5° C./min, held at −10° C. for 5 min, and then heated again to 190° C. at a temperature rise rate of 10° C./min; and
   wherein said crystalline higher α-olefin polymer has a single spin-lattice relaxation time $T_1$ observed at a temperature not lower than the melting point when the spin-lattice relaxation time ($T_1$) is measured by solid NMR analysis.

2. The crystalline higher α-olefin polymer according to claim 1, wherein said polymer has a weight-average molecular weight (Mw) of 1,000 to 10,000,000 as measured by gel permeation chromatography (GPC).

3. The crystalline higher α-olefin polymer according to claim 1, wherein said polymer has a molecular weight distribution (Mw/Mn) of 5.0 or lower as measured by gel permeation chromatography (GPC).

4. The crystalline higher α-olefin polymer according to claim 1, wherein said polymer has a stereoregularity index M2 of 50 mol % or higher.

5. A process for producing the crystalline higher α-olefin polymer as claimed in claim 1, comprising:
   polymerizing a higher α-olefin having 10 or more carbon atoms, in the presence of a polymerization catalyst comprising:
   (A) a transition metal compound represented by the following general formula (I):

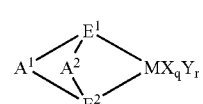

(I)

wherein M is a metal element belonging to Groups 3 to 10 or lanthanoid of the Period Table;

$E^1$ and $E^2$ are independently a ligand selected from the group consisting of substituted cyclopentadienyl, indenyl, substituted indenyl, heterocyclopentadienyl, substituted heterocyclopentadienyl, amide group, phosphide group, hydrocarbon groups and silicon-containing groups, which form a cross-linked structure via $A^1$ and $A^2$ and may be same or different from each other;

X is a ligand capable of forming a σ-bond with the proviso that when a plurality of X groups are present, these groups may be same or different from each other, and may be cross-linked with the other X group, $E^1$, $E^2$ or Y;

Y is a Lewis base with the proviso that when a plurality of Y groups are present, these groups may be same or different from each other, and may be cross-linked with the other Y group, $E^1$, $E^2$ or X;

$A^1$ and $A^2$ are divalent cross-linking groups capable of bonding the two ligands $E^1$ and $E^2$ to each other which may be same or different, and are independently a $C_1-C_{20}$ hydrocarbon group, a $C_1-C_{20}$ halogen-containing hydrocarbon group, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$— or —AlR$^1$— wherein $R^1$ is a hydrogen atom, a halogen atom, a $C_1-C_{20}$ hydrocarbon group or a $C_1-C20$ halogen-containing hydrocarbon group;

q is an integer of 1 to 5 given by the formula: [(valence of M)−2]; and r is an integer of 0 to 3, and (B) at least one component selected from the group consisting of (B-1) a compound capable of forming an ionic complex by reacting with said transition metal compound (A) or derivatives thereof, and (B-2) aluminoxane.

6. The crystalline higher α-olefin polymer according to claim 1, which comprises said at least one higher α-olefin in an amount of 50 mol % or higher.

7. The crystalline higher α-olefin polymer according to claim 1, which comprises said at least one higher α-olefin in an amount of 70 to 100 mol %.

8. The crystalline higher α-olefin polymer according to claim 1, which comprises said at least one higher α-olefin in an amount of 100 mol %.

9. The crystalline higher α-olefin polymer according to claim 1, wherein said at least one higher α-olefin is selected from the group consisting of -decene, 1-undecene, 1-dodecene, 1-tridecene, 1-tetradecene, 1-pentadecene, 1-hexadecene, 1-heptadecene, 1-octadecene, 1-nonadecene, 1-eicosene and mixtures thereof.

10. The crystalline higher α-olefin polymer according to claim 1, which comprises a mixture of higher α-olefins.

11. The crystalline higher α-olefin polymer according to claim 1, which comprises one higher α-olefin.

12. The crystalline higher α-olefin polymer according to claim 1, wherein said at least one higher α-olefin has not more than 25 carbon atoms.

13. The crystalline higher α-olefin polymer according to claim 1, wherein Tm is present between 20 and 80° C.

14. The crystalline higher α-olefin polymer according to claim 1, wherein Tm is present between 25 and 55° C.

15. The crystalline higher α-olefin polymer according to claim 1, which is isotactic.

16. The crystalline higher α-olefin polymer according to claim 1, further comprising in polymerized form units of 1-butene.

17. The crystalline higher α-olefin polymer according to claim 1, further comprising in polymerized form units of ethylene.

18. The crystalline higher α-olefin polymer according to claim 1, further comprising in polymerized form units of ethylene, C3–C20 α-olefin or mixtures thereof.

* * * * *